(12) United States Patent
Matsumoto et al.

(10) Patent No.: US 12,479,791 B2
(45) Date of Patent: *Nov. 25, 2025

(54) CATIONIC LIPID

(71) Applicant: Takeda Pharmaceutical Company Limited, Osaka (JP)

(72) Inventors: Satoru Matsumoto, Kanagawa (JP); Yoshimasa Omori, Kanagawa (JP); Masahiro Mineno, Kanagawa (JP); Yasuhiro Sawai, Kanagawa (JP); Nozomu Kakimoto, Kanagawa (JP); Yasutaka Hoashi, Kanagawa (JP)

(73) Assignee: TAKEDA PHARMACEUTICAL COMPANY LIMITED, Osaka (JP)

( * ) Notice: Subject to any disclaimer, the term of this patent is extended or adjusted under 35 U.S.C. 154(b) by 1065 days.

This patent is subject to a terminal disclaimer.

(21) Appl. No.: 17/267,179

(22) PCT Filed: Aug. 8, 2019

(86) PCT No.: PCT/JP2019/031411
§ 371 (c)(1),
(2) Date: Feb. 9, 2021

(87) PCT Pub. No.: WO2020/032184
PCT Pub. Date: Feb. 13, 2020

(65) Prior Publication Data
US 2022/0098142 A1    Mar. 31, 2022

(30) Foreign Application Priority Data
Aug. 10, 2018  (JP) .................................. 2018-151583

(51) Int. Cl.
*C07C 229/12* (2006.01)
*A61K 9/51* (2006.01)
*C12N 15/113* (2010.01)

(52) U.S. Cl.
CPC .......... *C07C 229/12* (2013.01); *A61K 9/5123* (2013.01); *C12N 15/113* (2013.01); *C12N 2310/14* (2013.01); *C12N 2320/32* (2013.01)

(58) Field of Classification Search
CPC .................................................. C07C 229/12
See application file for complete search history.

(56) References Cited

U.S. PATENT DOCUMENTS

| | | | |
|---|---|---|---|
| 5,334,761 A | 8/1994 | Gebeyehu et al. | |
| 5,965,404 A | 10/1999 | Buschle et al. | |
| 6,235,310 B1 | 5/2001 | Wang et al. | |
| 9,463,247 B2 * | 10/2016 | Ansell | C07C 229/12 |
| 2003/0124727 A1 | 7/2003 | Gaucheron et al. | |
| 2004/0043952 A1 | 3/2004 | Niedzinski et al. | |
| 2006/0008910 A1 | 1/2006 | MacLachlan et al. | |

(Continued)

FOREIGN PATENT DOCUMENTS

| | | |
|---|---|---|
| CN | 104672311 A | 6/2015 |
| CN | 106573877 A | 4/2017 |

(Continued)

OTHER PUBLICATIONS

Yan et al, "Cyclosporin—A potently induces highly cardiogenic progenitors from embryonic stem cells", Biochemical and Biophysical Research Communications, vol. 379, Issue 1, Jan. 30, 2009, pp. 115-120.
S. Hayward, "Engineering of Lipid Nanoparticles for Advanced Drug Delivery Applications", Chemical & Biomolecular Engineering Theses, Dissertations, & Student Research, Spring May 2015.
International Search Report of PCT/JP2019/031411.
International Search Report of PCT/JP2019/031418.
Japanese Office Action for Application No. 2020-535882, dated Apr. 4, 2023, 7 pages.
Columbian Office Action for Application No. NC2021/0001745, dated Jul. 11, 2023, 21 pages.

(Continued)

*Primary Examiner* — Yate' K Cutliff
(74) *Attorney, Agent, or Firm* — McCarter & English, LLP; David G. Conlin

(57) ABSTRACT

The present invention provides a technique capable of transferring an active ingredient, particularly, a nucleic acid, to a cell with excellent efficiency and a cationic lipid for use in this technique, etc. The cationic lipid of the present invention is a compound represented by the formula (I) or a salt thereof. n1 represents an integer of 2 to 6, n2 represents an integer of 0 to 2, n3 represents an integer of 0 to 2, L represents —C(O)O— or —NHC(O)O—, Ra represents a linear $C_{5-13}$ alkyl group, a linear $C_{13-17}$ alkenyl group or a linear $C_{17}$ alkadienyl group, Rb represents a linear $C_{2-9}$ alkyl group, Rc represents a hydrogen atom or a linear $C_{2-9}$ alkyl group, Rd represents a hydrogen atom or a linear $C_{2-9}$ alkyl group, Re represents a linear $C_{2-9}$ alkyl group, and Rf represents a linear $C_{2-9}$ alkyl group.

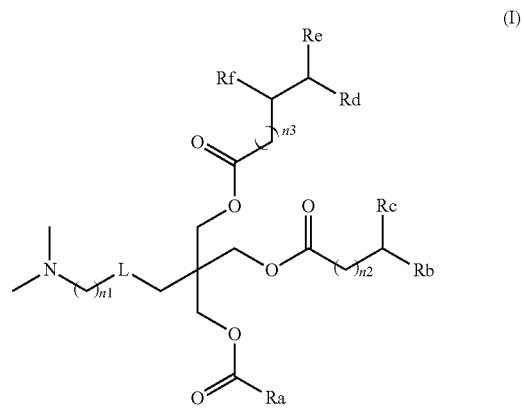

10 Claims, No Drawings
Specification includes a Sequence Listing.

(56) References Cited

U.S. PATENT DOCUMENTS

| | | |
|---|---|---|
| 2008/0145413 A1 | 6/2008 | Panzner et al. |
| 2010/0041152 A1 | 2/2010 | Wheeler et al. |
| 2010/0240731 A1 | 9/2010 | Adami et al. |
| 2012/0021044 A1 | 1/2012 | Oh et al. |
| 2013/0123485 A1 | 5/2013 | Park et al. |
| 2013/0149374 A1 | 6/2013 | Lee et al. |
| 2015/0064242 A1 | 3/2015 | Heyes et al. |
| 2015/0174261 A1 | 6/2015 | Kuboyama et al. |
| 2017/0197903 A1* | 7/2017 | Hoashi .............. A61K 31/7105 |
| 2017/0369846 A1 | 12/2017 | Yoshida et al. |
| 2018/0155304 A1 | 6/2018 | Nakai et al. |
| 2018/0185516 A1 | 7/2018 | Ansell et al. |
| 2020/0331841 A1 | 10/2020 | Matsumoto et al. |
| 2021/0052646 A1* | 2/2021 | Kuwae ................ A61K 47/6929 |
| 2022/0145329 A1 | 5/2022 | Yoshida et al. |
| 2023/0348361 A1 | 11/2023 | Zhang et al. |

FOREIGN PATENT DOCUMENTS

| | | | |
|---|---|---|---|
| CN | 115850104 A | 3/2023 | |
| CO | 4410255 A1 | 1/1997 | |
| CO | 2020008972 A2 | 7/2020 | |
| EA | 202091566 A1 | 9/2020 | |
| EP | 3178807 * | 6/2017 | ........... C07C 229/12 |
| EP | 3178807 A1 | 6/2017 | |
| EP | 3733211 A1 | 11/2020 | |
| EP | 3733844 A1 | 11/2020 | |
| JP | 2010158206 A | 7/2010 | |
| JP | 2018-47872 A | 3/2018 | |
| MX | 2020006843 A | 9/2020 | |
| RU | 2014138476 A | 4/2016 | |
| SG | 11202006033 Y | 7/2020 | |
| TW | 201813632 A | 4/2018 | |
| TW | 201932446 A | 8/2019 | |
| TW | 202021945 A | 6/2020 | |
| WO | 2003102150 A2 | 12/2003 | |
| WO | 2004/002453 A1 | 1/2004 | |
| WO | 2007002136 A2 | 1/2007 | |
| WO | 2009118928 A1 | 10/2009 | |
| WO | 2012/011693 A2 | 1/2012 | |
| WO | 2012/138453 A1 | 10/2012 | |
| WO | 2013086322 A1 | 6/2013 | |
| WO | WO 2013/086322 * | 6/2013 | ........... C07C 217/08 |
| WO | 2013/126803 A1 | 8/2013 | |
| WO | 2014/007398 A1 | 1/2014 | |
| WO | 2014/071072 A2 | 5/2014 | |
| WO | 2015/074085 A1 | 5/2015 | |
| WO | 2015/095340 A1 | 6/2015 | |
| WO | 2015141827 A1 | 9/2015 | |
| WO | 2016021683 A1 | 2/2016 | |
| WO | 2018062413 A1 | 4/2018 | |
| WO | WO 2018/062413 * | 4/2018 | ........... C12N 15/113 |
| WO | 2019131770 A1 | 7/2019 | |
| WO | 2019131829 A1 | 7/2019 | |
| WO | 2019131839 A1 | 7/2019 | |

OTHER PUBLICATIONS

Mexican Office Action for Application No. MX/a/2021/001654, dated Jun. 23, 2023, 10 pages.
Turnbull et al., Myocardial Delivery of Lipidoid Nanoparticle Carrying modRNA Induces Rapid and Transient Expression. Mol Ther. Feb. 2016;24(1):66-75.
US Office Action for U.S. Appl. No. 17/267,602, dated Sep. 12, 2023, 37 pages.
Chinese Office Action for Application No. 201980052837.1, dated Oct. 9, 2022, 17 pages.
Taiwan Office Action for Application No. 108128296, dated Jun. 14. 2023, 7 pages.
Jia et al., Reversed-Phase Liquid Chromatography-Quadrupole-Time-of-Flight Mass Spectrometry for High-Throughput Molecular Profiling of Sea Cucumber Cerebrosides. Lipids. Jul. 2015;50(7):667-79.
European Office Action for Application No. 19846186.5, dated May 6, 2022, 7 pages.
European Office Action for Application No. 19847498.3, dated May 11, 2022, 7 pages.
Singaporean Office Action for Application No. 11202101356Y, dated Jul. 5, 2022, 10 pages.
Russian Office Action for Application No. 2021105410, dated Feb. 10, 2022, 13 pages.
Taiwan Office Action for Application No. 108128297, dated Oct. 11, 2023, 8 pages.
European Office Action for Application No. 19847498.3, dated Jun. 21, 2024, 134 pages.
Columbian Office Action for Application No. NC2021/0001745, dated Mar. 8, 2024, 18 pages.
US Office Action for U.S. Appl. No. 17/267,602, dated Jun. 5, 2024, 16 pages.
Dhaliwal et al., Intranasal Delivery and Transfection of mRNA Therapeutics in the Brain Using Cationic Liposomes. Mol Pharm. Jun. 1, 2020;17(6):1996-2005.
Tang et al., Cell-Selective Messenger RNA Delivery and CRISPR/Cas9 Genome Editing by Modulating the Interface of Phenylboronic Acid-Derived Lipid Nanoparticles and Cellular Surface Sialic Acid. ACS Appl Mater Interfaces. Dec. 18, 2019;11(50):46585-46590.
US Office Action for U.S. Appl. No. 17/267,602, dated May 6, 2024, 16 pages.
U.S. Appl. No. 17/267,602, filed Feb. 10, 2021, 2022-0145329, Published.
Chinese Office Action for Application No. 202311153246.8, dated Jun. 3, 2025, 17 pages.

* cited by examiner

```
                    SEQUENCE LISTING

<160> NUMBER OF SEQ ID NOS: 6

<210> SEQ ID NO 1
<211> LENGTH: 21
<212> TYPE: DNA
<213> ORGANISM: Artificial Sequence
<220> FEATURE:
<223> OTHER INFORMATION: Luc siRNA (Sense)
<220> FEATURE:
<221> NAME/KEY: misc_feature
<222> LOCATION: (1)..(21)
<223> OTHER INFORMATION: The sequence comprises both RNA and DNA bases,
      some of which are modified bases.  The "t" stands for
      2'-deoxythymidine.
<220> FEATURE:
<221> NAME/KEY: modified_base
<222> LOCATION: (1)..(1)
<223> OTHER INFORMATION: The "c" stands for 2'-O-methylcytidine (cm)
<220> FEATURE:
<221> NAME/KEY: modified_base
<222> LOCATION: (2)..(2)
<223> OTHER INFORMATION: The "u" stands for 2'-O-methyluridine (um)
<220> FEATURE:
<221> NAME/KEY: modified_base
<222> LOCATION: (3)..(3)
<223> OTHER INFORMATION: The "u" stands for 2'-O-methyluridine (um)
<220> FEATURE:
<221> NAME/KEY: modified_base
<222> LOCATION: (5)..(5)
<223> OTHER INFORMATION: The "c" stands for 2'-O-methylcytidine (cm)
<220> FEATURE:
<221> NAME/KEY: modified_base
<222> LOCATION: (7)..(7)
<223> OTHER INFORMATION: The "c" stands for 2'-O-methylcytidine (cm)
<220> FEATURE:
<221> NAME/KEY: modified_base
<222> LOCATION: (8)..(8)
<223> OTHER INFORMATION: The "u" stands for 2'-O-methyluridine (um)
<220> FEATURE:
<221> NAME/KEY: modified_base
<222> LOCATION: (12)..(12)
<223> OTHER INFORMATION: The "u" stands for 2'-O-methyluridine (um)
<220> FEATURE:
<221> NAME/KEY: modified_base
<222> LOCATION: (14)..(14)
<223> OTHER INFORMATION: The "c" stands for 2'-O-methylcytidine (cm)
<220> FEATURE:
<221> NAME/KEY: modified_base
<222> LOCATION: (15)..(15)
<223> OTHER INFORMATION: The "u" stands for 2'-O-methyluridine (um)
<220> FEATURE:
<221> NAME/KEY: modified_base
<222> LOCATION: (16)..(16)
```

```
<223> OTHER INFORMATION: The "u" stands for 2'-O-methyluridine (um)
<220> FEATURE:
<221> NAME/KEY: modified_base
<222> LOCATION: (17)..(17)
<223> OTHER INFORMATION: The "c" stands for 2'-O-methylcytidine (cm)
<220> FEATURE:
<221> NAME/KEY: misc_feature
<222> LOCATION: (20)..(21)
<223> OTHER INFORMATION: The nucleosides (t and t) are bound with
      phosphorothioate.

<400> SEQUENCE: 1
cuuacgcuga guacuucgat t                                              21

<210> SEQ ID NO 2
<211> LENGTH: 21
<212> TYPE: DNA
<213> ORGANISM: Artificial Sequence
<220> FEATURE:
<223> OTHER INFORMATION: Luc siRNA (Antisense)
<220> FEATURE:
<221> NAME/KEY: misc_feature
<222> LOCATION: (1)..(21)
<223> OTHER INFORMATION: The sequence comprises both RNA and DNA bases,
      some of which are modified bases.  The "t" stands for
      2'-deoxythymidine.
<220> FEATURE:
<221> NAME/KEY: misc_feature
<222> LOCATION: (41)..(42)
<223> OTHER INFORMATION: The nucleosides (n and n) are bound with
      phosphorothioate.

<400> SEQUENCE: 2
ucgaaguacu gagcguaagt t                                              21

<210> SEQ ID NO 3
<211> LENGTH: 21
<212> TYPE: DNA
<213> ORGANISM: Artificial Sequence
<220> FEATURE:
<223> OTHER INFORMATION: Col1a1 siRNA (Sense)
<220> FEATURE:
<221> NAME/KEY: misc_feature
<222> LOCATION: (1)..(21)
<223> OTHER INFORMATION: The sequence comprises both RNA and DNA bases,
      some of which are modified bases.  The "t" stands for
      2'-deoxythymidine.
<220> FEATURE:
<221> NAME/KEY: modified_base
<222> LOCATION: (2)..(2)
<223> OTHER INFORMATION: The "u" stands for 2'-O-methyluridine (um)
<220> FEATURE:
<221> NAME/KEY: modified_base
<222> LOCATION: (3)..(3)
<223> OTHER INFORMATION: The "c" stands for 2'-O-methylcytidine (cm)
<220> FEATURE:
<221> NAME/KEY: modified_base
<222> LOCATION: (4)..(4)
<223> OTHER INFORMATION: The "u" stands for 2'-O-methyluridine (um)
<220> FEATURE:
<221> NAME/KEY: modified_base
<222> LOCATION: (8)..(8)
<223> OTHER INFORMATION: The "c" stands for 2'-O-methylcytidine (cm)
<220> FEATURE:
<221> NAME/KEY: modified_base
<222> LOCATION: (10)..(10)
<223> OTHER INFORMATION: The "u" stands for 2'-O-methyluridine (um)
<220> FEATURE:
<221> NAME/KEY: modified_base
<222> LOCATION: (12)..(12)
<223> OTHER INFORMATION: The "u" stands for 2'-O-methyluridine (um)
<220> FEATURE:
<221> NAME/KEY: modified_base
<222> LOCATION: (13)..(13)
<223> OTHER INFORMATION: The "u" stands for 2'-O-methyluridine (um)
```

```
<220> FEATURE:
<221> NAME/KEY: modified_base
<222> LOCATION: (14)..(14)
<223> OTHER INFORMATION: The "c" stands for 2'-O-methylcytidine (cm)
<220> FEATURE:
<221> NAME/KEY: modified_base
<222> LOCATION: (17)..(17)
<223> OTHER INFORMATION: The "c" stands for 2'-O-methylcytidine (cm)
<220> FEATURE:
<221> NAME/KEY: modified_base
<222> LOCATION: (18)..(18)
<223> OTHER INFORMATION: The "u" stands for 2'-O-methyluridine (um)
<220> FEATURE:
<221> NAME/KEY: modified_base
<222> LOCATION: (19)..(19)
<223> OTHER INFORMATION: The "u" stands for 2'-O-methyluridine (um)
<220> FEATURE:
<221> NAME/KEY: misc_feature
<222> LOCATION: (20)..(21)
<223> OTHER INFORMATION: The nucleosides (t and t) are bound with
      phosphorothioate.

<400> SEQUENCE: 3
gucuagacau guucagcuut t                                            21

<210> SEQ ID NO 4
<211> LENGTH: 21
<212> TYPE: DNA
<213> ORGANISM: Artificial Sequence
<220> FEATURE:
<223> OTHER INFORMATION: Col1a1 siRNA (Antisense)
<220> FEATURE:
<221> NAME/KEY: misc_feature
<222> LOCATION: (1)..(21)
<223> OTHER INFORMATION: The sequence comprises both RNA and DNA bases,
      some of which are modified bases.  The "t" stands for
      2'-deoxythymidine.
<220> FEATURE:
<221> NAME/KEY: modified_base
<222> LOCATION: (9)..(9)
<223> OTHER INFORMATION: The "c" stands for 2'-O-methylcytidine (cm)
<220> FEATURE:
<221> NAME/KEY: modified_base
<222> LOCATION: (15)..(15)
<223> OTHER INFORMATION: The "u" stands for 2'-O-methyluridine (um)
<220> FEATURE:
<221> NAME/KEY: modified_base
<222> LOCATION: (20)..(21)
<223> OTHER INFORMATION: The nucleosides (t and t) are bound with
      phosphorothioate.

<400> SEQUENCE: 4
aagcugaaca ugucuagact t                                            21

<210> SEQ ID NO 5
<211> LENGTH: 21
<212> TYPE: DNA
<213> ORGANISM: Artificial Sequence
<220> FEATURE:
<223> OTHER INFORMATION: Factor VII siRNA (Sense)
<220> FEATURE:
<221> NAME/KEY: misc_feature
<222> LOCATION: (1)..(21)
<223> OTHER INFORMATION: The sequence comprises both RNA and DNA bases,
      some of which are modified bases.  The "t" stands for
      2'-deoxythymidine.
<220> FEATURE:
<221> NAME/KEY: modified_base
<222> LOCATION: (4)..(4)
<223> OTHER INFORMATION: The "u" stands for 2'-deoxy-2'-fluorouridine
<220> FEATURE:
<221> NAME/KEY: modified_base
<222> LOCATION: (5)..(5)
<223> OTHER INFORMATION: The "c" stands for 2'-deoxy-2'-fluorocytidine
<220> FEATURE:
```

```
<221> NAME/KEY: modified_base
<222> LOCATION: (7)..(7)
<223> OTHER INFORMATION: The "u" stands for 2'-deoxy-2'-fluorouridine
<220> FEATURE:
<221> NAME/KEY: modified_base
<222> LOCATION: (8)..(8)
<223> OTHER INFORMATION: The "c" stands for 2'-deoxy-2'-fluorocytidine
<220> FEATURE:
<221> NAME/KEY: modified_base
<222> LOCATION: (9)..(9)
<223> OTHER INFORMATION: The "u" stands for 2'-deoxy-2'-fluorouridine
<220> FEATURE:
<221> NAME/KEY: modified_base
<222> LOCATION: (10)..(10)
<223> OTHER INFORMATION: The "c" stands for 2'-deoxy-2'-fluorocytidine
<220> FEATURE:
<221> NAME/KEY: modified_base
<222> LOCATION: (14)..(14)
<223> OTHER INFORMATION: The "u" stands for 2'-deoxy-2'-fluorouridine
<220> FEATURE:
<221> NAME/KEY: modified_base
<222> LOCATION: (15)..(15)
<223> OTHER INFORMATION: The "c" stands for 2'-deoxy-2'-fluorocytidine
<220> FEATURE:
<221> NAME/KEY: modified_base
<222> LOCATION: (16)..(16)
<223> OTHER INFORMATION: The "u" stands for 2'-deoxy-2'-fluorouridine
<220> FEATURE:
<221> NAME/KEY: modified_base
<222> LOCATION: (17)..(17)
<223> OTHER INFORMATION: The "u" stands for 2'-deoxy-2'-fluorouridine
<220> FEATURE:
<221> NAME/KEY: modified_base
<222> LOCATION: (19)..(19)
<223> OTHER INFORMATION: The "c" stands for 2'-deoxy-2'-fluorocytidine
<220> FEATURE:
<221> NAME/KEY: misc_feature
<222> LOCATION: (20)..(21)
<223> OTHER INFORMATION: The nucleosides (t and t) are bound with
      phosphorothioate.

<400> SEQUENCE: 5
ggaucaucuc aagucuuact t                                           21

<210> SEQ ID NO 6
<211> LENGTH: 21
<212> TYPE: DNA
<213> ORGANISM: Artificial Sequence
<220> FEATURE:
<223> OTHER INFORMATION: Factor VII siRNA (Antisense)
<220> FEATURE:
<221> NAME/KEY: misc_feature
<222> LOCATION: (1)..(21)
<223> OTHER INFORMATION: The sequence comprises both RNA and DNA bases,
      some of which are modified bases. The "t" stands for
      2'-deoxythymidine.
<220> FEATURE:
<221> NAME/KEY: modified_base
<222> LOCATION: (2)..(2)
<223> OTHER INFORMATION: The "u" stands for 2'-deoxy-2'-fluorouridine
<220> FEATURE:
<221> NAME/KEY: modified_base
<222> LOCATION: (7)..(7)
<223> OTHER INFORMATION: The "c" stands for 2'-deoxy-2'-fluorocytidine
<220> FEATURE:
<221> NAME/KEY: modified_base
<222> LOCATION: (8)..(8)
<223> OTHER INFORMATION: The "u" stands for 2'-deoxy-2'-fluorouridine
<220> FEATURE:
<221> NAME/KEY: modified_base
<222> LOCATION: (9)..(9)
<223> OTHER INFORMATION: The "u" stands for 2'-deoxy-2'-fluorouridine
<220> FEATURE:
<221> NAME/KEY: modified_base
<222> LOCATION: (14)..(14)
<223> OTHER INFORMATION: The "u" stands for 2'-deoxy-2'-fluorouridine
<220> FEATURE:
```

```
<221> NAME/KEY: modified_base
<222> LOCATION: (17)..(17)
<223> OTHER INFORMATION: The "u" stands for 2'-deoxy-2'-fluorouridine
<220> FEATURE:
<221> NAME/KEY: modified_base
<222> LOCATION: (18)..(18)
<223> OTHER INFORMATION: The "c" stands for 2'-deoxy-2'-fluorocytidine
<220> FEATURE:
<221> NAME/KEY: modified_base
<222> LOCATION: (19)..(19)
<223> OTHER INFORMATION: The "c" stands for 2'-deoxy-2'-fluorocytidine
<220> FEATURE:
<221> NAME/KEY: misc_feature
<222> LOCATION: (20)..(21)
<223> OTHER INFORMATION: The nucleosides (t and t) are bound with
      phosphorothioate.

<400> SEQUENCE: 6
guaagacuug agaugaucct t                                               21
```

CATIONIC LIPID

CROSS REFERENCE TO RELATED APPLICATION

The present application is a U.S. National Stage Entry of the International Patent Application No. PCT/JP2019/031411, filed on Aug. 8, 2019, which claims priority to Japanese Application No. 2018-151583, filed on Aug. 10, 2018. The entire contents of those applications are incorporated herein for all purposes by this reference.

SEQUENCE LISTING

The instant application contains a Sequence Listing which has been submitted electronically in ASCII format and is hereby incorporated by reference in its entirety. Said ASCII copy, created on Feb. 8, 2021, is named 058236-504N01US Sequence Listing.txt and is 7,572 bytes in size.

TECHNICAL FIELD

The present invention relates to a cationic lipid capable of transferring a nucleic acid as an active ingredient to many types of cells, tissues or organs. The present invention further relates to a lipid particle containing the cationic lipid, and a composition containing the lipid particle and a nucleic acid.

BACKGROUND OF INVENTION

In recent years, research and development have been actively made on nucleic acid medicaments containing a nucleic acid as an active ingredient. For example, many studies have been conducted on nucleic acid medicaments containing a nucleic acid such as siRNA, miRNA, miRNA mimic or antisense nucleic acid and having an effect of degrading or functionally suppressing target mRNA. Also, studies have been conducted on nucleic acid medicaments for the intracellular expression of a protein of interest, containing mRNA encoding the protein of interest and the like. In relation to such research and development, techniques for transferring a nucleic acid to a cells a tissue or an organ with high efficiency have been developed as drug delivery system (DDS) techniques.

Techniques of mixing a nucleic acid with a lipid to form a complex, followed by the cellular uptake of the nucleic acid via the complex have heretofore been known as the DDS techniques. Cationic lipids, hydrophilic polymer lipids, helper lipids, and the like have heretofore been known as lipids for use in the complex formation. For example, the following compounds described in the prior art documents are known as the cationic lipids.

Patent Literature 1 describes a compound represented by the following formula or a salt thereof, etc.

[Formula 1]

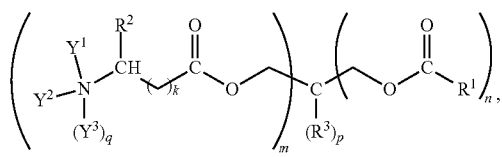

The formula is defined as follows: $R^1$ is each independently selected from the group consisting of optionally substituted $C_8$ to $C_{24}$ alkyl and optionally substituted $C_8$ to $C_{24}$ alkenyl; $R^2$ and $R^3$ are each independently selected from the group consisting of hydrogen, optionally substituted $C_1$ to $C_8$ alkyl, optionally substituted arylalkyl, and the like; $Y^1$ and $Y^2$ are each independently selected from the group consisting of hydrogen, optionally substituted $C_1$ to $C_6$ alkyl, optionally substituted arylalkyl, and the like; $Y^3$, if present, is each independently selected from the group consisting of hydrogen, optionally substituted $C_1$ to $C_8$ alkyl, optionally substituted arylalkyl, and the like; m is any integer of 1 to 4, n is any integer of 0 to 3, p is 0 or 1, and the total of m, n and p is 4; k is any integer of 1 to 5; q is 0 or 1.

Patent Literature 2 describes a compound represented by the following formula or a salt thereof, etc.

[Formula 2]

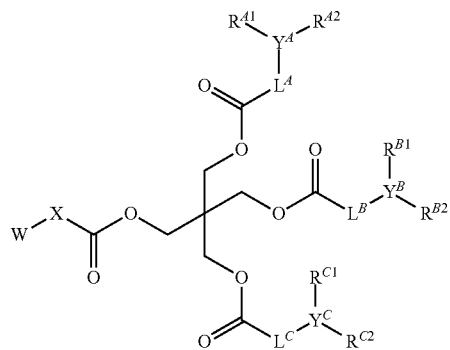

In the formula, W represents the formula $—NR^1R^2$ or the formula $—N^+R^3R^4R^5(Z^-)$, $R^1$ and $R^2$ each independently represent a $C_{1-4}$ alkyl group or a hydrogen atom, $R^3$, $R^4$ and $R^5$ each independently represent a $C_{1-4}$ alkyl group, $Z^-$ represents an anion, X represents an optionally substituted $C_{1-6}$ alkylene group, $Y^A$, $Y^B$ and $Y^C$ each independently represent an optionally substituted methine group, $L^A$, $L^B$ and $L^C$ each independently represent an optionally substituted methylene group or a bond, and $R^{A1}$, $R^{A2}$, $R^{B1}$, $R^{B2}$, $R^{C1}$ and $R^{C2}$ and each independently represent an optionally substituted $C_{4-10}$ alkyl group.

CITATION LIST

Patent Literature

Patent Literature 1: WO2003/102150
Patent Literature 2: WO2016/021683

SUMMARY OF INVENTION

Technical Problem

Cationic lipids capable of transferring a nucleic acid to a cell with high efficiency are expected to contribute to the development of nucleic acid medicaments that are excellent in exertion of drug efficacy, safety (low toxicity), etc. and have a therapeutically excellent effect. Also, cationic lipids capable of transferring a nucleic acid to various cells are expected to permit development of nucleic acid medicaments for various types of diseases caused in various tissues. However, any product that can sufficiently satisfy these expectations has not yet been found.

An object of the present invention is to provide a technique capable of transferring a nucleic acid to a cell with excellent efficiency and a cationic lipid for use in this technique, etc. In another aspect, an object of the present invention is to provide a technique capable of transferring a nucleic acid to various cells and a compound for use in this technique, etc.

Solution to Problem

The present inventors have conducted diligent studies to attain the objects and consequently completed the present invention by finding that use of a compound represented by the formula given below or a salt thereof can attain the objects.

Specifically, the present invention relates to at least the following aspects.

[1]
A compound represented by the formula (I):

[Formula 3]

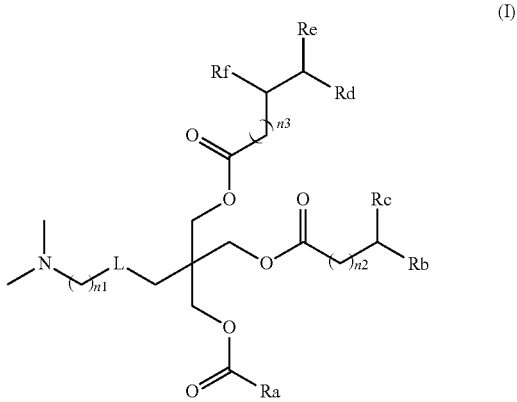

(I)

wherein n1 represents an integer of 2 to 6, n2 represents an integer of 0 to 2, n3 represents an integer of 0 to 2,
L represents —C(O)O— or —NHC(O)O—,
Ra represents a linear $C_{5-13}$ alkyl group, a linear $C_{13-17}$ alkenyl group or a linear $C_{17}$ alkadienyl group,
Rb represents a linear $C_{2-9}$ alkyl group,
Rc represents a hydrogen atom or a linear $C_{2-9}$ alkyl group,
Rd represents a hydrogen atom or a linear $C_{2-9}$ alkyl group,
Re represents a linear $C_{2-9}$ alkyl group, and
Rf represents a linear $C_{2-9}$ alkyl group,
or a salt thereof.

[2]
3-((5-(Dimethylamino)pentanoyl)oxy)-2,2-bis((octanoyloxy)methyl)propyl 4,5-dibutylnonanoate or a salt thereof.

[3]
2-(((4,5-Dibutylnonanoyl)oxy)methyl)-2-(((5-(dimethylamino)pentanoyl)oxy)methyl)propane-1,3-diyldidecanoate or a salt thereof.

[4]
3-((6-(Dimethylamino)hexanoyl)oxy)-2,2-bis((octanoyloxy)methyl)propyl 4,5-dibutylnonanoate or a salt thereof.

[5]
3-((5-(Dimethylamino)pentanoyl)oxy)-2,2-bis((octanoyloxy)methyl)propyl 4,5-dipentyldecanoate or a salt thereof.

3-((5-(Dimethylamino)pentanoyl)oxy)-2,2-bis((octanoyloxy)methyl)propyl 4-heptylundecanoate or a salt thereof.

[7]
A lipid particle comprising a compound according to item 1 or a salt thereof.

[8]
A composition for nucleic acid transfer comprising a nucleic acid and a lipid particle according to item 7.

[9]
The composition according to item 8, wherein the nucleic acid is RNA.

[10]
The composition according to item 9, wherein the RNA is mRNA or siRNA.

In the present specification, the "compound represented by the formula (I)" is also referred to as the "compound (I)". The "compound represented by formula (I) or salt thereof" is also referred to as the "compound of the present invention". The "lipid particle comprising (or containing) the compound represented by the formula (I) or the salt thereof (the compound of the present invention)" is also referred to as the "lipid particle of the present invention". The "composition for nucleic acid transfer comprising (or containing) a nucleic acid and the lipid particle of the present invention" is also referred to as the "composition of the present invention".

Advantageous Effects of Invention

The present invention enables a nucleic acid to be transferred to a cell, a tissue or an organ with excellent efficiency. The present invention also enables a nucleic acid to be transferred to many types of cells, tissues or organs (e.g., cancer cells). The present invention enables a medicament or a reagent for research to be obtained which transfers a nucleic acid to many types of cells, tissues or organs. In the case of transferring a nucleic acid to a cell, a tissue or an organ according to the present invention, the efficiency of exertion of the activity (e.g., drug efficacy) of the nucleic acid is high.

DETAILED DESCRIPTION OF THE INVENTION

Hereinafter, each substituent used in the present specification will be defined in detail. Each substituent has the following definition unless otherwise specified.

In the present specification, examples of the "linear $C_{5-13}$ alkyl group" include pentyl, hexyl, heptyl, octyl, nonyl, decanyl, undecanyl, dodecanyl, and tridecanyl.

In the present specification, examples of the "linear $C_{13-17}$ alkenyl group" include: 1-tridecenyl, 2-tridecenyl, 3-tridecenyl, 4-tridecenyl, 5-tridecenyl, 6-tridecenyl, 7-tridecenyl, 8-tridecenyl, 9-tridecenyl, 10-tridecenyl, 11-tridecenyl, and 12-tridecenyl; 1-tetradecenyl, 2-tetradecenyl, 3-tetradecenyl, 4-tetradecenyl, 5-tetradecenyl, 6-tetradecenyl, 7-tetradecenyl, 8-tetradecenyl, 9-tetradecenyl, 10-tetradecenyl, 11-tetradecenyl, 12-tetradecenyl, and 13-tetradecenyl; 1-pentadecenyl, 2-pentadecenyl, 3-pentadecenyl, 4-pentadecenyl, 5-pentadecenyl, 6-pentadecenyl, 7-pentadecenyl, 8-pentadecenyl, 9-pentadecenyl, 10-pentadecenyl, 11-pentadecenyl, 12-pentadecenyl, 13-pentadecenyl, and 14-pentadecenyl; 1-hexadecenyl, 2-hexadecenyl, 3-hexadecenyl, 4-hexadecenyl, 5-hexadecenyl, 6-hexadecenyl, 7-hexadecenyl, 8-hexadecenyl, 9-hexadecenyl, 10-hexadecenyl, 11-hexadecenyl, 12-hexadecenyl, 13-hexadecenyl, 14-hexadecenyl, and 15-hexadecenyl; and 1-heptadecenyl, 2-heptadecenyl, 3-heptadecenyl, 4-heptadecenyl, 5-heptadecenyl, 6-heptadecenyl, 7-heptadecenyl, 8-heptadecenyl, 9-heptadecenyl, 10-heptadecenyl, 11-heptadecenyl, 12-heptadecenyl, 13-heptadecenyl, 14-heptadecenyl, 15-heptadecenyl, and 16-heptadecenyl. These linear $C_{13-17}$ alkenyl groups contain one carbon-carbon double bond and may therefore assume cis and trans structures, any of which may be allowed.

In the present specification, examples of the "linear $C_{17}$ alkadienyl group" include 1,3-heptadecadienyl, 1,4-heptadecadienyl, 1,5-heptadecadienyl, 1,6-heptadecadienyl, 1,7-heptadecadienyl, 1,8-heptadecadienyl, 1,9-heptadecadienyl, 1,10-heptadecadienyl, 1,11-heptadecadienyl, 1,12-heptadecadienyl, 1,13-heptadecadienyl, 1,14-heptadecadienyl, 1,15-heptadecadienyl, 1,16-heptadecadienyl, 2,4-heptadecadienyl, 2,5-heptadecadienyl, 2,6-heptadecadienyl, 2,7-heptadecadienyl, 2,8-heptadecadienyl, 2,9-heptadecadienyl, 2,10-heptadecadienyl, 2,11-heptadecadienyl, 2,12-heptadecadienyl, 2,13-heptadecadienyl, 2,14-heptadecadienyl, 2,15-heptadecadienyl, 2,16-heptadecadienyl, 3,5-heptadecadienyl, 3,6-heptadecadienyl, 3,7-heptadecadienyl, 3,8-heptadecadienyl, 3,9-heptadecadienyl, 3,10-heptadecadienyl, 3,11-heptadecadienyl, 3,12-heptadecadienyl, 3,13-heptadecadienyl, 3,14-heptadecadienyl, 3,15-heptadecadienyl, 3,16-heptadecadienyl, 4,6-heptadecadienyl, 4,7-heptadecadienyl, 4,8-heptadecadienyl, 4,9-heptadecadienyl, 4,10-heptadecadienyl, 4,11-heptadecadienyl, 4,12-heptadecadienyl, 4,13-heptadecadienyl, 4,14-heptadecadienyl, 4,15-heptadecadienyl, 4,16-heptadecadienyl, 5,7-heptadecadienyl, 5,8-heptadecadienyl, 5,9-heptadecadienyl, 5,10-heptadecadienyl, 5,11-heptadecadienyl, 5,12-heptadecadienyl, 5,13-heptadecadienyl, 5,14-heptadecadienyl, 5,15-heptadecadienyl, 5,16-heptadecadienyl, 6,8-heptadecadienyl, 6,9-heptadecadienyl, 6,10-heptadecadienyl, 6,11-heptadecadienyl, 6,12-heptadecadienyl, 6,13-heptadecadienyl, 6,14-heptadecadienyl, 6,15-heptadecadienyl, 6,16-heptadecadienyl, 7,9-heptadecadienyl, 7,10-heptadecadienyl, 7,11-heptadecadienyl, 7,12-heptadecadienyl, 7,13-heptadecadienyl, 7,14-heptadecadienyl, 7,15-heptadecadienyl, 7,16-heptadecadienyl, 8,10-heptadecadienyl, 8,11-heptadecadienyl, 8,12-heptadecadienyl, 8,13-heptadecadienyl, 8,14-heptadecadienyl, 8,15-heptadecadienyl, 8,16-heptadecadienyl, 9,11-heptadecadienyl, 9,12-heptadecadienyl, 9,13-heptadecadienyl, 9,14-heptadecadienyl, 9,15-heptadecadienyl, 9,16-heptadecadienyl, 10,12-heptadecadienyl, 10,13-heptadecadienyl, 10,14-heptadecadienyl, 10,15-heptadecadienyl, 10,16-heptadecadienyl, 11,13-heptadecadienyl, 11,14-heptadecadienyl, 11,15-heptadecadienyl, 11,16-heptadecadienyl, 12,14-heptadecadienyl, 12,15-heptadecadienyl, 12,16-heptadecadienyl, 13,15-heptadecadienyl, 13,16-heptadecadienyl, and 14,16-heptadecadienyl. These linear $C_{17}$ alkadienyl groups contain two carbon-carbon double bonds and may therefore assume cis and trans structures at each of the bonds independently, any of which may be allowed.

In the present specification, examples of the "linear $C_{2-9}$ alkyl group" include ethyl, butyl, propyl, pentyl, hexyl, heptyl, octyl, and nonyl.

Respective preferred examples of n1, n2, n3, L, Ra, Rb, Rc, Rd, Re, and Rf in the formula (I) are as follows.

n1 is preferably an integer of 3 to 5.
n2 is preferably an integer of 0 to 2.
n3 is preferably an integer of 0 to 2.
L is preferably —C(O)O—.
Ra is preferably a linear $C_{5-9}$ alkyl group, a linear $C_{13-17}$ alkenyl group or a linear $C_{17}$ alkadienyl group.

Rb is preferably a linear $C_{4-8}$ alkyl group.
Rc is preferably a hydrogen atom or a linear $C_{4-7}$ alkyl group.
Rd is preferably a hydrogen atom or a linear $C_{3-6}$ alkyl group.
Re is preferably a linear $C_{3-6}$ alkyl group.
Rf is preferably a linear $C_{3-7}$ alkyl group.
Preferred specific examples of the compound (I) are as follows.

Compound (I-A): a compound wherein n1 is an integer of 3 to 5, n2 is 0, n3 is an integer of 0 to 2, L is —C(O)O—, Ra is a linear $C_{5-9}$ alkyl group, Rb is a linear $C_{4-8}$ alkyl group, Rc is a hydrogen atom, Rd is a hydrogen atom, Re is a linear $C_{3-6}$ alkyl group, and Rf is a linear $C_{3-7}$ alkyl group.

Compound (I-B): a compound wherein n1 is an integer of 3 to 5, n2 is 0 or 1, n3 is 0 or 1, L is —C(O)O—, Ra is a linear $C_{5-9}$ alkyl group, Rb is a linear $C_{4-8}$ alkyl group, Rc is a linear $C_{5-7}$ alkyl group, Rd is a hydrogen atom, Re is a linear $C_{3-6}$ alkyl group, and Rf is a linear $C_{3-7}$ alkyl group.

Compound (I-C): a compound wherein n1 is an integer of 3 to 5, n2 is 0 or 1, n3 is an integer of 0 to 2, L is —C(O)O—, Ra is a linear $C_{5-9}$ alkyl group, Rb is a linear $C_{4-8}$ alkyl group, Rc is a hydrogen atom, Rd is a linear $C_{3-6}$ alkyl group, Re is a linear $C_{3-6}$ alkyl group, and Rf is a linear $C_{3-7}$ alkyl group.

Compound (I-D): a compound wherein n1 is an integer of 3 to 5, n2 is 0 or 1, n3 is an integer of 0 to 2, L is —C(O)O—, Ra is a linear $C_{13-17}$ alkenyl group or a linear $C_{17}$ alkadienyl group, Rb is a linear $C_{3-6}$ alkyl group, Rc is a linear $C_{3-6}$ alkyl group, Rd is a hydrogen atom, Re is a linear $C_{2-6}$ alkyl group, and Rf is a linear $C_{2-7}$ alkyl group.

More preferred specific examples of the compound (I) are as follows.

Compound (a): a compound wherein n1 is 3 or 4, n2 is 0, n3 is 0 or 2, L is —C(O)O—, Ra is a linear $C_7$ alkyl group, Rb is a linear $C_6$ alkyl group, Rc is a hydrogen atom, Rd is a hydrogen atom, Re is a linear $C_{5-6}$ alkyl group, and Rf is a linear $C_{6-7}$ alkyl group.

Compound (b): a compound wherein n1 is an integer of 3 to 5, n2 is 0 or 1, n3 is 0 or 1, L is —C(O)O—, Ra is a linear $C_{6-7}$ alkyl group, Rb is a linear $C_{5-6}$ alkyl group, Rc is a linear $C_{5-6}$ alkyl group, Rd is a hydrogen atom, Re is a linear $C_{4-5}$ alkyl group, and Rf is a linear $C_{5-6}$ alkyl group.

Compound (c): a compound wherein n1 is an integer of 3 to 5, n2 is 0, n3 is 2, L is —C(O)O—, Ra is a linear $C_{5-9}$ alkyl group, Rb is a linear $C_{4-8}$ alkyl group, Rc is a hydrogen atom, Rd is a linear $C_{3-5}$ alkyl group, Re is a linear $C_{3-5}$ alkyl group, and Rf is a linear $C_{3-5}$ alkyl group.

Compound (d): a compound wherein n1 is an integer of 3 to 5, n2 is 0 or 1, n3 is an integer of 0 to 2, L is —C(O)O—, Ra is a linear $C_{13-17}$ alkenyl group or a linear $C_{17}$ alkadienyl group, Rb is a linear $C_{3-5}$ alkyl group, Rc is a linear $C_{3-5}$ alkyl group, Rd is a hydrogen atom, Re is a linear $C_{3-6}$ alkyl group, and Rf is a linear $C_{3-7}$ alkyl group.

Particularly preferred specific examples of the compound (I) are as follows:

3-((5-(dimethylamino)pentanoyl)oxy)-2,2-bis((octanoyloxy)methyl)propyl 4,5-dibutylnonanoate;

2-(((4,5-dibutylnonanoyl)oxy)methyl)-2-(((5-(dimethylamino)pentanoyl)oxy)methyl)propane-1,3-diyl didecanoate;

3-((6-(dimethylamino)hexanoyl)oxy)-2,2-bis((octanoyloxy)methyl)propyl 4,5-dibutylnonanoate;

3-((5-(dimethylamino)pentanoyl)oxy)-2,2-bis((octanoyloxy)methyl)propyl 4,5-dipentyldecanoate; and 3-((5-(dimethylamino)pentanoyl)oxy)-2,2-bis((octanoyloxy)methyl)propyl 4-heptylundecanoate.

The salt of the compound (I) is preferably a pharmacologically acceptable salt. Examples thereof include salts with inorganic bases, salts with organic bases, salts with inorganic acids, salts with organic acids, and salts with basic or acidic amino acids.

Preferred examples of the salts with inorganic bases include: alkali metal salts such as sodium salt and potassium salt; alkaline earth metal salts such as calcium salt and magnesium salt; aluminum salt; and ammonium salt. Sodium salt, potassium salt, calcium salt, and magnesium salt are preferred, and sodium salt and potassium salt are more preferred.

Preferred examples of the salts with organic bases include salts with trimethylamine, triethylamine, pyridine, picoline, ethanolamine, diethanolamine, triethanolamine, tromethamine [tris(hydroxymethyl)methylamine], tert-butylamine, cyclohexylamine, benzylamine, dicyclohexylamine, and N,N-dibenzylethylenediamine.

Preferred examples of the salts with inorganic acids include salts with hydrofluoric acid, hydrochloric acid, hydrobromic acid, hydroiodic acid, nitric acid, sulfuric acid, and phosphoric acid. Salts with hydrochloric acid and salts with phosphoric acid are preferred.

Preferred examples of the salts with organic acids include salts with formic acid, acetic acid, trifluoroacetic acid, phthalic acid, fumaric acid, oxalic acid, tartaric acid, maleic acid, citric acid, succinic acid, malic acid, methanesulfonic acid, benzenesulfonic acid, and p-toluenesulfonic acid.

Preferred examples of the salts with basic amino acids include salts with arginine, lysine, and ornithine.

Preferred examples of the salts with acidic amino acids include salts with aspartic acid and glutamic acid.

In the present invention, the compound of the present invention can be used as a cationic lipid. The cationic lipid may form a complex with a plurality of molecules in a solvent or a dispersion medium. The complex may contain an additional component, in addition to the compound of the present invention. Examples of the additional component include other lipid components and nucleic acids.

Examples of the other lipid components include structured lipids that can constitute lipid particles. For example, at least one member selected from the group consisting of:
  sterols (e.g., cholesterol, cholesterol ester, and cholesteryl hemisuccinate);
  phospholipids (e.g., phosphatidylcholines (e.g., dipalmitoylphosphatidylcholine, distearoylphosphatidylcholine, lysophosphatidylcholine, dioleoylphosphatidylcholine, palmitoyloleoylphosphatidylcholine, dipalmitoylphosphatidylcholine, dilinolenoylphosphatidylcholine, MC-1010 (NOF Corporation), MC-2020 (NOF Corporation), MC-4040 (NOF Corporation), MC-6060 (NOF Corporation), and MC-8080(NOF Corporation)), phosphatidylserines (e.g., dipalmitoylphosphatidylserine, distearoylphosphatidylserine, dioleoylphosphatidylserine, and palmitoyloleoylphosphatidylserine), phosphatidylethanolamines (e.g., dipalmitoylphosphatidylethanolamine, distearoylphosphatidylethanolamine, dioleoylphosphatidylethanolamine, palmitoyloleoylphosphatidylethanolamine, and lysophosphatidylethanolamine), phosphatidylinositol, and phosphatidic acid); and
  polyethylene glycol lipids (PEG lipids) (e.g., PEG-DAA, PEG-DAG, PEG-phospholipid cunjugate, PEG-Cer, PEG-cholesterol, PEG-C-DOMG, 2KPEG-CMG, GM-020 (NOF Corporation), GS-020 (NOF Corporation), and GS-050 (NOF Corporation)) can be used as such a structured lipid. In the present invention, all three members of a sterol (particularly, cholesterol), a phospholipid (particularly, phosphatidylcholine) and a polyethylene glycol lipid are preferably used as structured lipids.

The ratio between the compound of the present invention and the structured lipid in a mixed lipid component forming the lipid particle of the present invention can be appropriately adjusted according to a purpose or an application. For example, the ratio of the structured lipid is usually 0.008 to 4 mol, preferably 0.4 to 1.5 mol, based on 1 mol of the compound of the present invention. According to another definition, the contents in the mixed lipid component are usually 1 to 4 mol of the compound of the present invention, usually 0 to 3 mol of the sterol, usually 0 to 2 mol of the phospholipid and usually 0 to 1 mol of the polyethylene glycol lipid. In a more preferred aspect, in the case of using the compound of the present invention and an additional lipid component in a mixture, the contents are 1 to 1.5 mol of the compound of the present invention, 0 to 1.25 mol of the sterol, 0 to 0.5 mol of the phospholipid and 0 to 0.125 mol of the polyethylene glycol lipid.

The compound of the present invention can be used for producing the lipid particle of the present invention. The lipid particle of the present invention means the complex described above except that the complex does not contain a nucleic acid. The shape of the lipid particle of the present invention is not particularly limited and includes, for example, a complex assembled by the compound of the present invention, etc. so as to constitute a spherical shape, a complex assembled thereby without constituting a specific shape, a complex dissolved in a solvent, and a complex dispersed uniformly or nonuniformly in a dispersion medium.

The lipid particle of the present invention (e.g., a lipid particle constituted by the compound of the present invention and an additional structured lipid) can be used for producing, for example, the composition of the present invention containing the lipid particle and a nucleic acid (particularly, a nucleic acid which is a substance useful for a pharmaceutical application or an application for a research purpose). The composition of the present invention can be used as a medicament or a reagent. In the composition of the present invention, it is preferred that the maximum possible proportion of the nucleic acid should be encapsulated in the lipid particle (i.e., the rate of encapsulation should be high).

The "nucleic acid" can be any molecule of polymerized nucleotides and molecules having functions equivalent to those of the nucleotides. Examples thereof can include RNA which is a polymer of ribonucleotides, DNA which is a polymer of deoxyribonucleotides, a polymer of a mixture of ribonucleotides and deoxyribonucleotides, and a nucleotide polymer containing a nucleotide analog. Alternatively, a nucleotide polymer containing a nucleic acid derivative may be used. The nucleic acid may be a single-stranded nucleic acid or a double-stranded nucleic acid. The double-stranded nucleic acid also includes a double-stranded nucleic acid in which one of the strands hybridizes under stringent conditions to the other strand.

The nucleotide analog can be any molecule as long as the molecule is a ribonucleotide, a deoxyribonucleotide, RNA or DNA modified in order to improve nuclease resistance, in order to stabilize, in order to enhance affinity for a complementary strand nucleic acid, in order to enhance cell permeability, or in order to visualize the molecule, as compared with RNA or DNA. The nucleotide analog may be a naturally occurring molecule or a non-natural molecule.

Examples thereof include a nucleotide analog with a modified sugar moiety and a nucleotide analog with a modified phosphodiester bond.

The nucleotide analog with a modified sugar moiety can be any molecule as long as an arbitrary chemical structural substance is added to or replaced for a portion or the whole of the chemical structure of a sugar in a nucleotide. Specific examples thereof include a nucleotide analog substituted by 2'-O-methyl ribose, a nucleotide analog substituted by 2'-O-propyl ribose, a nucleotide analog substituted by 2'-methoxyethoxy ribose, a nucleotide analog substituted by 2'-O-methoxyethyl ribose, a nucleotide analog substituted by 2'-O-[2-(guanidium)ethyl]ribose, a nucleotide analog substituted by 2'-fluoro ribose, a nucleic acid analog with a sugar moiety substituted by a morpholino ring (morpholino nucleic acid), bridged nucleic acid (BNA) having two cyclic structures by the introduction of a bridged structure to the sugar moiety, more specifically, locked nucleic acid (LNA) with an oxygen atom at position 2' and a carbon atom at position 4' bridged via methylene, and ethylene bridged nucleic acid (ENA) [Nucleic Acid Research, 32, e175 (2004)], and amide-bridged nucleic acid (AmNA) with a carbon atom at position 2' and a carbon atom at position 4' bridged via an amide bond, and can further include peptide nucleic acid (PNA)[Acc. Chem. Res., 32, 624 (1999)], oxypeptide nucleic acid (OPNA) [J. Am. Chem. Soc., 123, 4653 (2000], and peptide ribonucleic acid (PRNA) [J. Am. Chem. Soc., 122, 6900 (2000)].

The nucleotide analog with a modified phosphodiester bond can be any molecule as long as an arbitrary chemical structural substance is added to or replaced for a portion or the whole of the chemical structure of a phosphodiester bond in a nucleotide. Specific examples thereof can include a nucleotide analog substituted by a phosphorothioate bond, and a nucleotide analog substituted by a N3'-P5' phosphoramidate bond [Cell Engineering, 16, 1463-1473 (1997)] [RNAi Method and Antisense Method, Kodansha Ltd. (2005)].

The nucleic acid derivative can be any molecule as long as the molecule is a nucleic acid with another chemical substance added thereto in order to improve nuclease resistance, in order to stabilize, in order to enhance affinity for a complementary strand nucleic acid, in order to enhance cell permeability, or in order to visualize the molecule, as compared with a nucleic acid. Specific examples thereof can include a 5'-polyamine-added derivative, a cholesterol-added derivative, a steroid-added derivative, a bile acid-added derivative, a vitamin-added derivative, a Cy5-added derivative, a Cy3-added derivative, a 6-FAM-added derivative, and a biotin-added derivative.

The nucleic acid according to the present invention is not particularly limited and may be a nucleic acid aimed at, for example, amelioration of a disease, a symptom, a disorder, or morbidity, and reduction of a disease, a symptom, a disorder or a pathological condition or prevention of onset thereof (in the present specification, also referred to as the "treatment, etc. of a disease"), or may be a nucleic acid for regulating the expression of the desired protein useful for research, albeit not contributing to the treatment, etc. of a disease.

Information on a gene or a polynucleotide related to a disease (in the present specification, also referred to as the "disease-related gene") is available from, for example, McKusick-Nathans Institute of Genetic Medicine, Johns Hopkins University (Baltimore, Md.) and National Center for Biotechnology Information, National Library of Medicine (Bethesda, Md.).

Specific examples of the nucleic acid according to the present invention include siRNA, miRNA, miRNA mimic, antisense nucleic acid, ribozyme, mRNA, decoy nucleic acid, and aptamer. The nucleic acid is preferably RNA such as siRNA or mRNA, or an analog or derivative thereof obtained by artificial modification.

In the present invention, the "siRNA" means double-stranded RNA of 10 to 30 bases, preferably 15 to 25 bases, or an analog thereof, containing complementary sequences. The siRNA has preferably 1 to 3, more preferably 2 overhang bases at the 3' end. The complementary sequence moiety may be completely complementary or may contain a noncomplementary base, and is preferably completely complementary.

The siRNA according to the present invention is not particularly limited, and, for example, siRNA for knocking down the gene expression of a disease-related gene can be used. The disease-related gene refers to an arbitrary gene or polynucleotide that yields a transcription or translation product at an abnormal level or in an abnormal form in a cell derived from an affected tissue as compared with a non-diseased control tissue or cell. Alternatively, siRNA for regulating the expression of the desired protein useful for research may be used as the siRNA according to the present invention.

In the present invention, the "mRNA" means RNA containing a nucleotide sequence translatable into a protein. The mRNA according to the present invention is not particularly limited as long as the mRNA can cause intracellular expression of the desired protein. The mRNA is preferably mRNA useful for a pharmaceutical application (e.g., an application to disease treatment) and/or an application for a research purpose. Examples of such mRNA include mRNA for the intracellular expression of a marker protein such as luciferase.

Examples of the disease described above include, but are not particularly limited to, diseases described below. Examples of the disease-related gene are shown within the parentheses "( )" except for the case where specific examples of the disease are described. Examples of the nucleic acid according to the present invention also include nucleic acids regulating the expression levels of these disease-related genes (or proteins encoded thereby).

(1) Hematological diseases [anemia (CDAN1, CDA1, RPS19, DBA, PKLR, PK1, NT5C3, UMPH1, PSN1, RHAG, RH50A, NRAMP2, SPTB, ALAS2, ANH1, ASB, ABCB7, ABC7, and ASAT), bare lymphocyte syndrome (TAPBP, TPSN, TAP2, ABCB3, PSF2, RING11, MHC2TA, C2TA, and RFX5), bleeding diseases (TBXA2R, P2RX1, and P2X1), factor H and factor H-like factor 1 deficiency(HF1, CFH, and HUS), factor V and factor VIII deficiency (MCFD2), factor VII deficiency (F7), factor X deficiency (F10), factor XI deficiency (F11), factor XII deficiency (F12 and HAF), factor XIIIA deficiency (F13A1 and F13A), factor XIIIB deficiency (F13B), fanconi anemia (FANCA, FACA, FA1, FA, FAA, FAAP95, FAAP90, FLJ34064, FANCB, FANCC, FACC, BRCA2, FANCD1, FANCD2, FANCD, FACD, FAD, FACE, FACE, FANCF, XRCC9, FANCG, BRIP1, BACH1, FANCJ, PHF9, FANCL, FANCM, and KIAA1596), hemophagocytic lymphohistiocytosis (PRF1, HPLH2, UNC13D, MUNC13-4, HPLH3, HLH3, and FHL3), hemophilia A (F8, F8C, and HEMA), hemophilia B (F9 and HEMB), bleeding disorders (PI, ATT, and F5), leukocyte defect (ITGB2, CD18, LCAMB, LAD, EIF2B1, EIF2BA, EIF2B2, EIF2B3, EIF2B5, LVWM, CACH, CLE, and EIF2B4), sickle-cell anemia (HBB), thalassemia (HBA2, HBB, HBD, LCRB, and HBA1), etc.];

(2) inflammatory or immunological diseases [AIDS (KIR3DL1, NKAT3, NKB1, AMB11, KIR3DS1, IFNG, CXCL12, and SDF1), autoimmune lymphoproliferative syndrome (TNFRSF6, APT1, FAS, CD95, and ALPS1A), combined immunodeficiency disease (IL2RG, SCIDX1, SCIDX, and IMD4), HIV infection (CCL5, SCYA5, D17S135E, TCP228, IL10, CSIF, CMKBR2, CCR2, DMKBR5, CCCKR5, and CCR5), immunodeficiency disease (CD3E, CD3G, AICDA, AID, HIGM2, TNFRSFS, CD40, UNG, DGU, HIGM4, TNFSFS, CD40LG, HIGM1, IGM, FOXP3, IPEX, AIID, XPID, PIDX, TNFRSF14B, and TACI), inflammation (IL10, IL-1, IL-13, IL-17, IL-23, and CTLA4), severe combined immunodeficiency disease (JAK3, JAKL, DCLRE1C, ATREMIS, SCIDA, RAG1, RAG2, ADA, PTPRC, CD45, LCA, IL7R, CD3D, T3D, IL2RG, SCIDX1, SCIDX, and IMD4), rheumatoid arthritis, psoriasis, inflammatory bowel disease (e.g., Crohn disease and colitis ulcerosa), Sjogren's syndrome, Behcet's disease, multiple sclerosis, systemic lupus erythematosus, lupus nephritis, discoid lupus erythematosus, Castleman's disease, ankylosing spondylitis, polymyositis, dermatomyositis, polyarteritis nodosa, mixed connective tissue disease, scleroderma, lupus erythematosus profundus, chronic thyroiditis, Graves' disease, autoimmune gastritis, type I and type II diabetes mellitus, autoimmune hemolytic anemia, autoimmune neutropenia, thrombocytopenia, atopic dermatitis, chronic active hepatitis, myasthenia gravis, graft versus host disease, Addison's disease, abnormal immune response, arthritis, dermatitis, radiodermatitis, primary biliary cirrhosis, etc.];

(3) metabolic, liver, or kidney diseases [amyloid neuropathy (TTR and PALB), amyloidosis (APOA1, APP, AAA, CVAP, AD1, GSN, FGA, LYZ, TTR, and PALB), non-alcoholic steatohepatitis and hepatic fibrosis (COL1A1), hepatic cirrhosis (KRT18, KRT8, CIRH1A, NAIC, TEX292, and KIAA1988), cystic fibrosis (CFTR, ABCC7, CF, and MRP7), glycogen storage disease (SLC2A2, GLUT2, G6PC, G6PT, G6PT1, GAA, LAMP2, LAMPB, AGL, GDE, GBE1, GYS2, PYGL, and PFKM), hepatocellular adenoma (TCF1, HFN1A, and MODY3), hepatic failure (SCOD1 and SCO1), hepatic lipase deficiency (LIPC), hepatoblastoma (CTNNB1, PDFGRL, PDGRL, PRLTS, AXIN1, AXIN, TP53, P53, LFS1, IGF2R, MPRI, MET, CASP8, and MCH5), medullary cystic kidney disease (UMOD, HNFJ, FJHN, MCKD2, and ADMCKD2), phenyl ketonuria (PAH, PKU1, QDPR, DHPR, and PTS), polycystic kidney and liver diseases (FCYT, PKHD1, APRKD, PDK1, PDK2, PDK4, PDKTS, PRKCSH, G19P1, PCLD, and SEC63), etc.];

(4) neurological diseases [ALS (SOD1, ALS2, STEX, FUS, TARDBP, and VEGF), Alzheimer's disease (APP, AAA, CVAP, AD1, APOE, AD2, PSEN2, AD4, STM2, APBB2, FE65L1, NOS3, PLAU, URK, ACE, DCP1, ACE1, MPO, PACIP1, PAXIP1L, PTIP, A2M, BLMH, BMH, PSEN1, and AD3), autism (BZRAP1, MDGA2, GLO1, MECP2, RTT, PPMX, MRX16, MRX79, NLGN3, NLGN4, KIAA1260, and AUTSX2), fragile X syndrome (FMR2, FXR1, FXR2, and mGLUR5), Huntington's disease (HD, IT15, PRNP, PRIP, JPH3, JP3, HDL2, TBP, and SCA17), Parkinson's disease (NR4A2, NURR1, NOT, TINUR, SNCAIP, TBP, SCA17, SNCA, NACP, PARK1, PARK4, DJ1, DBH, and NDUFV2), Rett syndrome (MECP2, RTT, PPMX, MRX16, MRX79, CDKL5, and STK9), schizophrenia (GSK3, 5-HTT, COMT, DRD, SLC6A3, DAOA, and DTNBP1), secretase-related disorder (APH-1), etc.];

(5) eye diseases [age-related macular degeneration (Abcr, Ccl2, cp, Timp3, cathepsin D, Vldlr, and Ccr2), cataract (CRYAA, CRYA1, CRYBB2, CRYB2, PITX3, BFSP2, CP49, CP47, PAX6, AN2, MGDA, CRYBA1, CRYB1, CRYGC, CRYG3, CCL, LIM2, MP19, CRYGD, CRYG4, BSFP2, CP49, CP47, HSF4, CTM, MIP, AQP0, CRYAB, CRYA2, CTPP2, CRYBB1, CRYGD, CRYG4, CRYA1, GJA8, CX50, CAE1, GJA3, CX46, CZP3, CAE3, CCM1, CAM, and KRIT1), corneal opacity (APOA1, TGFB1, CSD2, CDGG1, CSD, BIGH3, CDG2, TASTD2, TROP2, M1S1, VSX1, RINX, PPCD, PPD, KTCN, COL8A2, FECD, PPCD2, PIP5K3, and CFD), cornea plana congenita familiares (KERA and CNA2), glaucoma (MYOC, TIGR, GLC1A, JOAG, GPOA, OPTN, GLC1E, FIP2, HYPL, NRP, CYP1B1, GLC3A, OPA1, NTG, NPG, CYP1B1, and GLC3A), Leber's congenital amaurosis (CRB1, RP12, CRX, CORD2, CRD, RPGRIP1, LCA6, CORD9, RPE65, RP20, AIPL1, LCA4, GUCY2D, GUC2D, LCA1, CORD6, RDH12, and LCA3), macular dystrophy (ELOVL4, ADMD, STGD2, STGD3, RDS, RP7, PRPH2, PRPH, AVMD, AOFMD, and VMD2), etc.]; and (6) neoplastic diseases [malignant tumor, neovascular glaucoma, infantile hemangioma, multiple myeloma, chronic sarcoma, metastatic melanoma, Kaposi's sarcoma, vascular proliferation, cachexia, metastasis of breast cancer, etc., cancers (e.g., colorectal cancer (e.g., familial colorectal cancer, hereditary non-polyposis colorectal cancer, and gastrointestinal stromal tumor), lung cancer (e.g., non-small cell lung cancer, small-cell lung cancer, and malignant mesothelioma), mesothelioma, pancreatic cancer (e.g., ductal pancreatic cancer), stomach cancer (e.g., papillary adenocarcinoma, mucous adenocarcinoma, and adenosquamous carcinoma), breast cancer (e.g., invasive ductal breast cancer, noninvasive ductal breast cancer, and inflammatory breast cancer), ovarian cancer (e.g., epithelial ovarian cancer, extragonadal germ cell tumor, ovarian germ cell tumor, and ovarian tumor of low malignant potential), prostate cancer (e.g., hormone-dependent prostate cancer and hormone-independent prostate cancer), liver cancer (e.g., primary liver cancer and extrahepatic bile duct cancer), thyroid cancer (e.g., medullary thyroid cancer), kidney cancer (e.g., renal cell cancer and transitional cell cancer of the renal pelvis and ureter), uterine cancer, brain tumor (e.g., pineal astrocytoma, pilocytic astrocytoma, diffuse astrocytoma, and anaplastic astrocytoma), melanoma, sarcoma, bladder cancer, blood cancer, etc. including multiple myeloma, pituitary adenoma, glioma, acoustic schwannoma, retinal sarcoma, throat cancer, voice box cancer, tongue cancer, thymoma, esophageal cancer, duodenal cancer, colon cancer, rectal cancer, hepatocellular carcinoma, pancreatic endocrine tumor, bile duct cancer, gallbladder cancer, penis cancer, ureter cancer, testicular tumor, vulval cancer, uterine cervical cancer, uterine body cancer, uterine sarcoma, trophoblastic disease, vaginal cancer, skin cancer, mycosis fungoides, basal cell tumor, soft tissue sarcoma, malignant lymphoma, Hodgkin's disease, myelodysplastic syndrome, adult T cell leukemia, chronic myeloproliferative disease, pancreatic endocrine tumor, fibrous histiocytoma, leiomyosarcoma, rhabdomyosarcoma, and cancer of unknown primary origin), leukemia (e.g., acute leukemia (e.g., acute lymphatic leukemia and acute myeloid leukemia), chronic leukemia (e.g., chronic lymphatic leukemia and chronic myeloid leukemia), and myelodysplastic syndrome), uterine sarcoma (e.g., mixed mesodermal tumor, uterine leiomyosarcoma, and endometrial stromal tumor), myelofibrosis, etc.].

The composition of the present invention as a medicament can be produced by a method known in the field of pharmaceutical formulation techniques using a pharmaceutically acceptable carrier. Examples of the dosage form of the medicament can include preparations for parenteral administration (e.g., solutions such as injections) supplemented with auxiliary agents commonly used such as a buffer and/or a stabilizer, and local preparations such as ointments, creams, solutions or plasters supplemented with pharmaceutical carriers commonly used.

The composition of the present invention can be used for transferring an active ingredient to many types of cells, tissues or organs. Examples of the cell to which the composition of the present invention can be applied include spleen cell, nerve cell, glia cell, pancreatic B cell, bone marrow cell, mesangial cell, Langerhans cell, epidermal cell, epithelial cell, endothelial cell, fibroblast, fiber cell, muscle cell (e.g., skeletal muscle cell, cardiac muscle cell, myoblast, and satellite cell), fat cell, immune cell (e.g., macrophage, T cell, B cell, natural killer cell, mast cell, neutrophil, basophil, eosinophil, monocyte, and megakaryocyte), synovial cell, cartilage cell, bone cell, osteoblast, osteoclast, mammary gland cell, liver cell or stromal cell, egg cell, sperm cell, or progenitor cell inducible to differentiate into these cells, stem cell (including e.g., induced pluripotent stem cell (iPS cell) and embryonic stem cell (ES cell)), blood cell, oocyte, and fertilized egg. Examples of the tissue or the organ to which the composition of the present invention can be applied include every tissue or organ where the cell described above are present, for example, brain, each site of brain (e.g., olfactory bulb, amygdaloid nucleus, cerebral basal ganglia, hippocampus, thalamus, hypothalamus, hypothalamic nucleus, cerebral cortex, oblong medulla, cerebellum, occipital lobe, frontal lobe, temporal lobe, putamen, caudate nucleus, corpus callosum, and substantia nigra), spinal cord, pituitary gland, stomach, pancreas, kidney, liver, genital gland, thyroid gland, gallbladder, bone marrow, adrenal gland, skin, muscle, lung, gastrointestinal tract (e.g., large intestine and small intestine), vascular vessel, heart, thymus gland, spleen, submandibular gland, peripheral blood, peripheral blood cell, prostate, testis, orchis, ovary, placenta, uterus, bone, joint and skeletal muscle. These cells, tissues or organs may be cancer cells, cancer tissues or the like resulting from malignant transformation.

In one embodiment of the present invention, the composition of the present invention is used for transferring a nucleic acid as an active ingredient to a cell other than a cardiac muscle cell or a tissue or an organ other than the heart.

The composition of the present invention is excellent, particularly, in the efficiency of nucleic acid transfer to a cancer cell.

The compound, the lipid particle and the composition of the present invention can be used with stability, low toxicity and safety. In the case of using the composition of the present invention in vivo or as a medicament, the composition can be administered to a recipient (e.g., a human or a nonhuman mammal (e.g., a mouse, a rat, a hamster, a rabbit, a cat, a dog, cattle, sheep, or a monkey) (preferably a human)) such that an effective amount of the nucleic acid is delivered to a targeted cell.

In the case of using the composition of the present invention in vivo or as a medicament, the composition can be safely administered as a pharmaceutical preparation, for example, tablets (including sugar-coated tablets, film-coated tablets, sublingual tablets, and orally disintegrating tablets), powders, granules, capsules (including soft capsules and microcapsules), solutions, troches, syrups, emulsions, suspensions, injections (e.g., subcutaneous injections, intravenous injections, intramuscular injections, and intraperitoneal injections), external preparations (e.g., transnasal administration preparations, transdermal preparations, ointments), suppositories (e.g., rectal suppositories and vaginal suppositories), pellets, transnasal agents, transpulmonary agents (inhalants), or drops, through an oral or parenteral (e.g., local, rectal, or intravenous administration) route. These preparations may be release-controlled preparations such as quick-release preparations or sustained-release preparations (e.g., sustained-release microcapsules).

Hereinafter, a method for producing the compound of the present invention will be described.

A starting material or a reagent used in each step in the production method given below and the obtained compound may each form a salt. Examples of such a salt include the same as the aforementioned salt of the compound of the present invention.

When the compound obtained in each step is a free compound, this compound can be converted to a salt of interest by a known method. On the contrary, when the compound obtained in each step is a salt, this salt can be converted to a free form or another type of salt of interest by a known method.

The compound obtained in each step may be used in the next reaction in the form of its reaction solution or after being obtained as a crude product. Alternatively, the compound obtained in each step can be isolated and/or purified from the reaction mixture by a separation approach such as concentration, crystallization, recrystallization, distillation, solvent extraction, fractionation, or chromatography according to a routine method.

If a starting material or a reagent compound for each step is commercially available, the commercially available product can be used directly.

In the reaction of each step, the reaction time may differ depending on the reagent or the solvent used and is usually 1 minute to 48 hours, preferably 10 minutes to 8 hours, unless otherwise specified.

In the reaction of each step, the reaction temperature may differ depending on the reagent or the solvent used and is usually −78° C. to 300° C., preferably −78° C. to 150° C., unless otherwise specified.

In the reaction of each step, the pressure may differ depending on the reagent or the solvent used and is usually 1 atm to 20 atm, preferably 1 atm to 3 atm, unless otherwise specified.

In the reaction of each step, a microwave synthesis apparatus, for example, Initiator manufactured by Biotage Japan Ltd., may be used. The reaction temperature may differ depending on the reagent or the solvent used and is usually room temperature to 300° C., preferably room temperature to 250° C., more preferably 50° C. to 250° C., unless otherwise specified. The reaction time may differ depending on the reagent or the solvent used and is usually 1 minute to 48 hours, preferably 1 minute to 8 hours, unless otherwise specified.

In the reaction of each step, the reagent is used at 0.5 equivalents to 20 equivalents, preferably 0.8 equivalents to 5 equivalents, based on the substrate, unless otherwise specified. In the case of using the reagent as a catalyst, the reagent is used at 0.001 equivalents to 1 equivalent, preferably 0.01 equivalents to 0.2 equivalents, based on the substrate. When the reagent also serves as a reaction solvent, the reagent is used in the amount as the solvent.

In the reaction of each step, this reaction is carried out without a solvent or by dissolution or suspension in an appropriate solvent, unless otherwise specified. Specific examples of the solvent include solvents described in Examples and the following:
- alcohols: methanol, ethanol, isopropanol, isobutanol, tert-butyl alcohol, 2-methoxyethanol, and the like;
- ethers: diethyl ether, diisopropyl ether, diphenyl ether, tetrahydrofuran, 1,2-dimethoxyethane, cyclopentyl methyl ether, and the like;
- aromatic hydrocarbons: chlorobenzene, toluene, xylene, and the like;
- saturated hydrocarbons: cyclohexane, hexane, heptane, and the like;
- amides: N,N-dimethylformamide, N-methylpyrrolidone, and the like;
- halogenated hydrocarbons: dichloromethane, carbon tetrachloride, and the like;
- nitriles: acetonitrile and the like;
- sulfoxides: dimethyl sulfoxide and the like;
- aromatic organic bases: pyridine and the like;
- acid anhydrides: acetic anhydride and the like;
- organic acids: formic acid, acetic acid, trifluoroacetic acid, and the like;
- inorganic acids: hydrochloric acid, sulfuric acid, and the like;
- esters: ethyl acetate, acetic acid isopropyl ester, and the like;
- ketones: acetone, methyl ethyl ketone, and the like; and
- water.

Two or more of these solvents may be used as a mixture at an appropriate ratio.

In the case of using a base in the reaction of each step, for example, the following base or a base described in Examples is used:
- inorganic bases: sodium hydroxide, potassium hydroxide, magnesium hydroxide, and the like;
- basic salts: sodium carbonate, calcium carbonate, sodium bicarbonate, and the like;
- organic bases: triethylamine, diethylamine, N,N-diisopropylethylamine, pyridine, 4-dimethylaminopyridine, N,N-dimethylaniline, 1,4-diazabicyclo[2.2.2]octane, 1,8-diazabicyclo[5.4.0]-7-undecene, imidazole, piperidine, and the like;
- metal alkoxides: sodium ethoxide, potassium tert-butoxide, sodium tert-butoxide, and the like;
- alkali metal hydrides: sodium hydride, and the like;
- metal amides: sodium amide, lithium diisopropylamide, lithium hexamethyldisilazide, and the like; and
- organic lithiums: n-butyllithium, sec-butyllithium, and the like.

In the case of using an acid or an acidic catalyst in the reaction of each step, for example, the following acid or acidic catalyst or an acid or an acidic catalyst described in Examples is used:
- inorganic acids: hydrochloric acid, sulfuric acid, nitric acid, hydrobromic acid, phosphoric acid, and the like;
- organic acids: acetic acid, trifluoroacetic acid, citric acid, p-toluenesulfonic acid, 10-camphorsulfonic acid, and the like; and
- Lewis acids: boron trifluoride-diethyl ether complex, zinc iodide, anhydrous aluminum chloride, anhydrous zinc chloride, anhydrous iron chloride, and the like.

The reaction of each step is carried out according to a known method, for example, a method described in The Fifth Series of Experimental Chemistry, Vol. 13 to Vol. 19 (edited by The Chemical Society of Japan); Shin Jikken Kagaku Koza (in Japanese, translated title: New Experimental Chemistry), Vol. 14 to Vol. 15 (edited by The Chemical Society of Japan); Seimitsu Yuki Kagaku (in Japanese, translated title: Precise Organic Chemistry, original title: Reaktionen und Synthesen im organisch-chemischen Praktikum und Forschungslaboratorium) Revised, 2nd Ed. (L. F. Tietze, Th. Eicher, Nankodo Co., Ltd.); Organic Named Reactions; The Reaction Mechanism and Essence, Revised (Hideo Tougo, Kodansha Ltd.); Organic Syntheses Collective Volume Ito VII (John Wiley & Sons, Inc.); Modern Organic Synthesis in the Laboratory: A Collection of Standard Experimental Procedures (Jie Jack Li, Oxford University Press); Comprehensive Heterocyclic Chemistry III, Vol. 1 to Vol. 14 (Elsevier Japan KK); Strategic Applications of Named Reactions in Organic Synthesis (translated by Kiyoshi Tomioka, published by Kagaku-Dojin Publishing Company, Inc.); Comprehensive Organic Transformations (VCH Publishers, Inc.) (1989), etc., or a method described in Examples, unless otherwise specified.

In each step, the protection or deprotection reaction of a functional group is carried out according to a known method, for example, a method described in "Protective Groups in Organic Synthesis, 4th Ed." (Theodora W. Greene, Peter G. M. Wuts), Wiley-Interscience (2007); "Protecting Groups, 3rd Ed." (P. J. Kocienski), Thieme Medical Publishers (2004), etc., or a method described in Examples.

Examples of a protective group for a hydroxy group or a phenolic hydroxy group in an alcohol or the like include: ether-type protective groups such as methoxy methyl ether, benzyl ether, p-methoxy benzyl ether, t-butyl dimethyl silyl ether, t-butyl diphenyl silyl ether, and tetrahydropyranyl ether; carboxylic acid ester-type protective groups such as acetic acid ester; sulfonic acid ester-type protective groups such as methanesulfonic acid ester; and carbonic acid ester-type protective groups such as t-butyl carbonate.

Examples of a protective group for a carbonyl group in an aldehyde include: acetal-type protective groups such as dimethylacetal; and cyclic acetal-type protective groups such as cyclic 1,3-dioxane.

Examples of a protective group for a carbonyl group in a ketone include: ketal-type protective groups such as dimethylketal; cyclic ketal-type protective groups such as cyclic 1,3-dioxane; oxime-type protective groups such as O-methyloxime; and hydrazone-type protective groups such as N,N-dimethylhydrazone.

Examples of a protective group for a carboxyl group include: ester-type protective groups such as methyl ester; and amide-type protective groups such as N,N-dimethylamide.

Examples of a protective group for a thiol include: ether-type protective groups such as benzyl thioether; and ester-type protective groups such as thioacetic acid ester, thiocarbonate, and thiocarbamate.

Examples of a protective group for an amino group or an aromatic heterocyclic ring such as imidazole, pyrrole, or indole include: carbamate-type protective groups such as benzyl carbamate; amide-type protective groups such as acetamide; alkylamine-type protective groups such as N-triphenylmethylamine; and sulfonamide-type protective groups such as methanesulfonamide.

These protective groups can be removed by use of a known method, for example, a method using an acid, a base, ultraviolet light, hydrazine, phenylhydrazine, sodium N-methyldithiocarbamate, tetrabutylammonium fluoride, palladium acetate, or trialkylsilyl halide (e.g., trimethylsilyl iodide and trimethylsilyl bromide), or a reduction method.

In the case of carrying out reduction reaction in each step, examples of the reducing agent used include: metal hydrides such as lithium aluminum hydride, sodium triacetoxyborohydride, sodium cyanoborohydride, diisobutyl aluminum hydride (DIBAL-H), sodium borohydride, and tetramethylammonium triacetoxyborohydride; boranes such as a borane-tetrahydrofuran complex; Raney nickel; Raney cobalt; hydrogen; and formic acid. For example, Raney nickel or Raney cobalt can be used in the presence of hydrogen or formic acid. In the case of reducing a carbon-carbon double bond or triple bond, a method using a catalyst such as palladium-carbon or a Lindlar's catalyst can be used.

In the case of carrying out oxidation reaction in each step, examples of the oxidizing agent used include: peracids such as m-chloroperbenzoic acid (MCPBA), hydrogen peroxide, and t-butyl hydroperoxide; perchlorates such as tetrabutylammonium perchlorate; chlorates such as sodium chlorate; chlorites such as sodium chlorite; periodates such as sodium periodate; high-valent iodine reagents such as iodosylbenzene; reagents having manganese, such as manganese dioxide and potassium permanganate; leads such as lead tetraacetate; reagents having chromium, such as pyridinium chlorochromate (PCC), pyridinium dichromate (PDC), and Jones reagents; halogen compounds such as N-bromosuccinimide (NBS); oxygen; ozone; a sulfur trioxide-pyridine complex; osmium tetroxide; selenium dioxide; and 2,3-dichloro-5,6-dicyano-1,4-benzoquinone (DDQ).

In the case of carrying out radical cyclization reaction in each step, examples of the radical initiator used include: azo compounds such as azobisisobutyronitrile (AIBN); water-soluble radical initiators such as 4-4'-azobis-4-cyanopentanoic acid (ACPA); triethylboron in the presence of air or oxygen; and benzoyl peroxide. Examples of the radical reaction agent used include tributylstannane, tristrimethylsilylsilane, 1,1,2,2-tetraphenyldisilane, diphenylsilane, and samarium iodide.

In the case of carrying out Wittig reaction in each step, examples of the Wittig reagent used include alkylidenephosphoranes. The alkylidenephosphoranes can be prepared by a known method, for example, the reaction between a phosphonium salt and a strong base.

In the case of carrying out Horner-Emmons reaction in each step, examples of the reagent used include: phosphonoacetic acid esters such as methyl dimethylphosphonoacetate and ethyl diethylphosphonoacetate; and bases such as alkali metal hydrides and organic lithiums.

In the case of carrying out Friedel-Crafts reaction in each step, examples of the reagent used include a Lewis acid and an acid chloride or an alkylating agent (e.g., alkyl halides, alcohols, and olefins). Alternatively, an organic acid or an inorganic acid may be used instead of the Lewis acid, and an acid anhydride such as acetic anhydride may be used instead of the acid chloride.

In the case of carrying out aromatic nucleophilic substitution reaction in each step, a nucleophile (e.g., amines and imidazole) and a base (e.g., basic salts and organic bases) are used as reagents.

In the case of carrying out nucleophilic addition reaction using a carbanion, nucleophilic 1,4-addition reaction (Michael addition reaction) using a carbanion, or nucleophilic substitution reaction using a carbanion in each step, examples of the base used for generating the carbanion include organic lithiums, metal alkoxides, inorganic bases, and organic bases.

In the case of carrying out Grignard reaction in each step, examples of the Grignard reagent include: aryl magnesium halides such as phenyl magnesium bromide; and alkyl magnesium halides such as methyl magnesium bromide and isopropyl magnesium bromide. The Grignard reagent can be prepared by a known method, for example, the reaction between alkyl halide or aryl halide and metal magnesium with ether or tetrahydrofuran as a solvent.

In the case of carrying out Knoevenagel condensation reaction in each step, an active methylene compound flanked by two electron-attracting groups (e.g., malonic acid, diethyl malonate, and malononitrile) and a base (e.g., organic bases, metal alkoxides, and inorganic bases) are used as reagents.

In the case of carrying out Vilsmeier-Haack reaction in each step, phosphoryl chloride and an amide derivative (e.g., N,N-dimethylformamide) are used as reagents.

In the case of carrying out azidation reaction of alcohols, alkyl halides, or sulfonic acid esters in each step, examples of the azidating agent used include diphenylphosphorylazide (DPPA), trimethylsilylazide, and sodium azide. In the case of azidating, for example, alcohols, a method using diphenylphosphorylazide and 1,8-diazabicyclo[5.4.0]undec-7-ene (DBU), a method using trimethylsilylazide and a Lewis acid, or the like can be used.

In the case of carrying out reductive amination reaction in each step, examples of the reducing agent used include sodium triacetoxyborohydride, sodium cyanoborohydride, hydrogen, and formic acid. When the substrate is an amine compound, examples of the carbonyl compound used include p-formaldehyde as well as aldehydes such as acetaldehyde, and ketones such as cyclohexanone. When the substrate is a carbonyl compound, examples of the amines used include: primary amine such as ammonia and methylamine; and secondary amine such as dimethylamine.

In the case of carrying out Mitsunobu reaction in each step, azodicarboxylic acid esters (e.g., diethyl azodicarboxylate (DEAD) and diisopropyl azodicarboxylate (DIAD)) and triphenylphosphine are used as reagents.

In the case of carrying out esterification reaction, amidation reaction, or ureation reaction in each step, examples of the reagent used include: an acyl halide form of acid chloride, acid bromide, and the like; and activated carboxylic acids such as an acid anhydride, an active ester form, and a sulfuric acid ester form. Examples of the activator for carboxylic acid include: carbodiimide condensing agents such as 1-ethyl-3-(3-dimethylaminopropyl)carbodiimide hydrochloride (WSCD); triazine condensing agents such as 4-(4,6-dimethoxy-1,3,5-triazin-2-yl)-4-methylmorpholinium chloride-n-hydrate (DMT-MM); carbonic acid ester condensing agents such as 1,1-carbonyldiimidazole (CDI); diphenylphosphorylazide (DPPA); benzotriazol-1-yloxy-trisdimethylaminophosphonium salt (BOP reagent); 2-chloro-1-methyl-pyridinium iodide (Mukaiyama reagent); thionyl chloride; lower alkyl haloformate such as ethyl chloroformate; O-(7-azabenzotriazol-1-yl)-N,N,N',N'-tetramethyluronium hexafluorophosphate (HATU); sulfuric acid; and combinations thereof. In the case of using a carbodiimide condensing agent, an additive such as 1-hydroxybenzotriazole (HOBt), N-hydroxysuccinimide (HOSu), or dimethylaminopyridine (DMAP) may be further added for the reaction.

In the case of carrying out coupling reaction in each step, examples of the metal catalyst used include: palladium compounds such as palladium(II) acetate, tetrakis(triphenylphosphine)palladium(0), dichlorobis(triphenylphosphine)palladium(II), dichlorobis(triethylphosphine)palladium(II), tris(dibenzylideneacetone)dipalladium(0), 1,1'-bis(diphenylphosphino)ferrocene palladium(II) chloride, and palladium(II) acetate; nickel compounds such as tetrakis(triphenylphosphine)nickel(0); rhodium compounds such as tris(triphenylphosphine)rhodium(III) chloride; cobalt compounds; copper compounds such as copper oxide and copper (I) iodide; and platinum compounds. A base may be further added for the reaction. Examples of such a base include inorganic bases and basic salts.

In the case of carrying out thiocarbonylation reaction in each step, diphosphorus pentasulfide is typically used as a thiocarbonylating agent. A reagent having a 1,3,2,4-dithiadiphosphetane-2,4-disulfide structure such as 2,4-bis(4-methoxyphenyl-1,3,2,4-dithiadiphosphetane-2,4-disulfide (Lawesson's reagent) may be used instead of diphosphorus pentasulfide.

In the case of carrying out Wohl-Ziegler reaction in each step, examples of the halogenating agent used include N-iodosuccinimide, N-bromosuccinimide (NBS), N-chlorosuccinimide (NCS), bromine, and sulfuryl chloride. The reaction can be accelerated by the further addition of heat, light, a radical initiator such as benzoyl peroxide or azobisisobutyronitrile for the reaction.

In the case of carrying out halogenation reaction of a hydroxy group in each step, examples of the halogenating agent used include a hydrohalic acid and an acid halide of an inorganic acid, specifically, hydrochloric acid, thionyl chloride, and phosphorus oxychloride for chlorination, and 48% hydrobromic acid for bromination. Also, a method for obtaining an alkyl halide form from an alcohol by the action of triphenylphosphine and carbon tetrachloride or carbon tetrabromide or the like may be used. Alternatively, a method for synthesizing an alkyl halide form through 2-stage reactions involving the conversion of an alcohol to sulfonic acid ester and the subsequent reaction with lithium bromide, lithium chloride, or sodium iodide may be used.

In the case of carrying out Arbuzov reaction in each step, examples of the reagent used include: alkyl halides such as ethyl bromoacetate; and phosphites such as triethyl phosphite and tri(isopropyl) phosphite.

In the case of carrying out sulfone-esterification reaction in each step, examples of the sulfonylating agent used include methanesulfonyl chloride, p-toluenesulfonyl chloride, methanesulfonic anhydride, p-toluenesulfonic anhydride, and trifluoromethanesulfonic anhydride.

In the case of carrying out hydrolysis reaction in each step, an acid or a base is used as a reagent. In the case of carrying out acid hydrolysis reaction of t-butyl ester, formic acid, triethylsilane, or the like may be added in order to reductively trap a by-product t-butyl cation.

In the case of carrying out dehydration reaction in each step, examples of the dehydrating agent used include sulfuric acid, diphosphorus pentoxide, phosphorus oxychloride, N,N'-dicyclohexylcarbodiimide, alumina, and polyphosphoric acid.

The compound (I) can be produced by, for example, a production method given below. In the present invention, the compound (I) having the desired structure can be synthesized by using a starting material appropriate for the structure of the compound (I) of interest, particularly, for esterification. The salt of the compound (I) can be obtained by appropriate mixing with an inorganic base, an organic base, an organic acid, or a basic or acidic amino acid.

[Formula 4-1]
Production method A
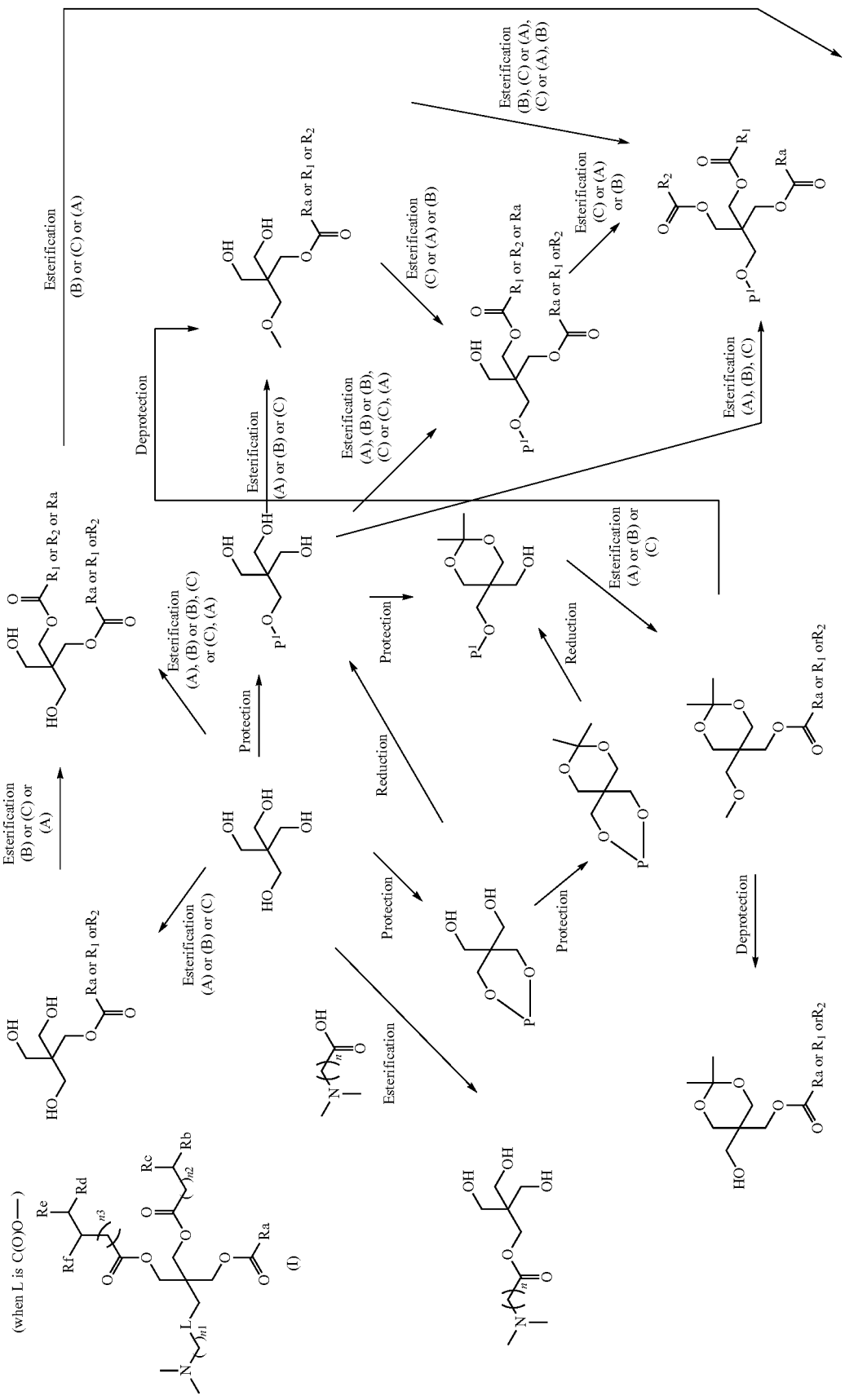

-continued
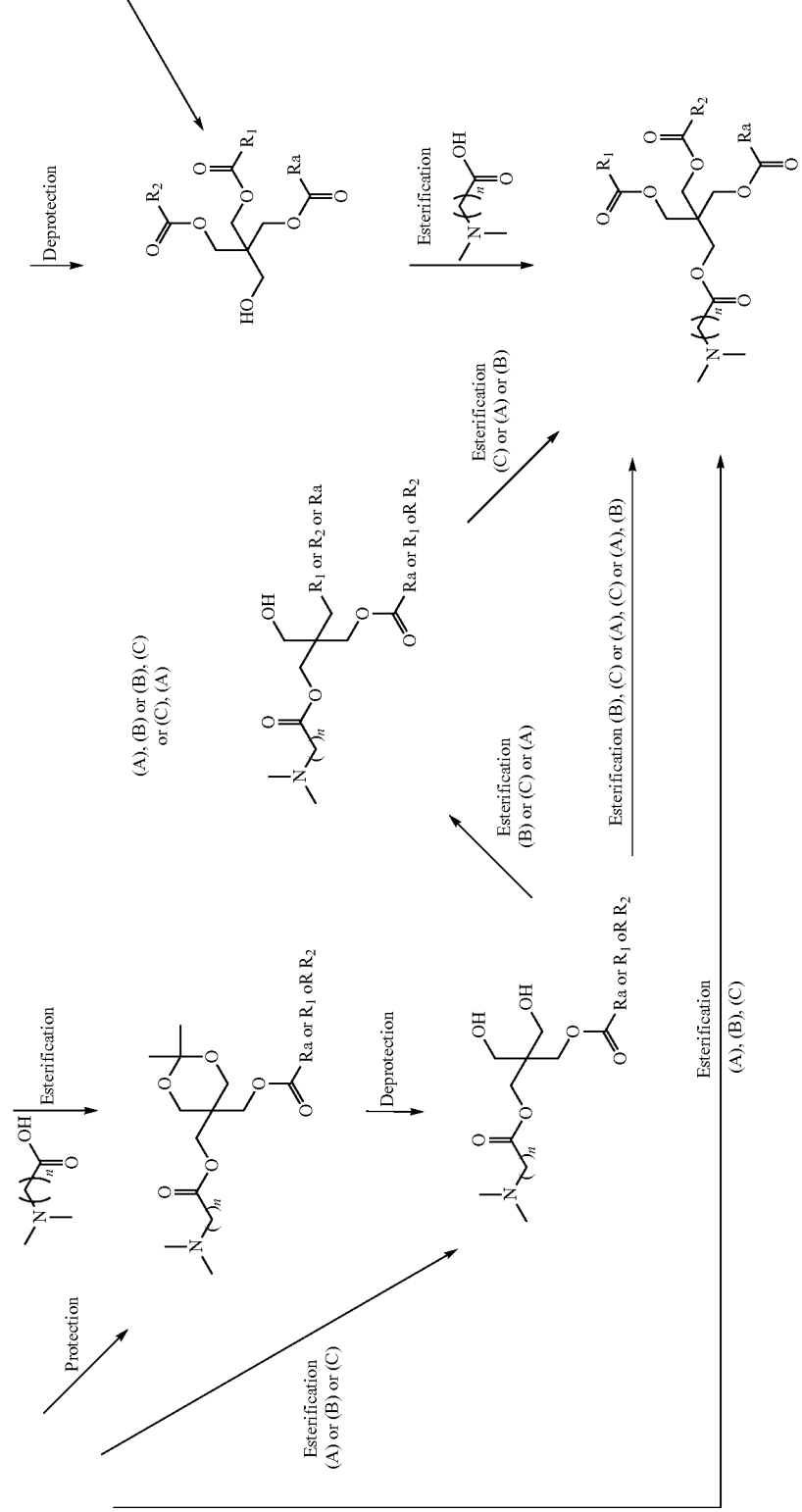

[Formula 4-2]

[Formula 4-3]
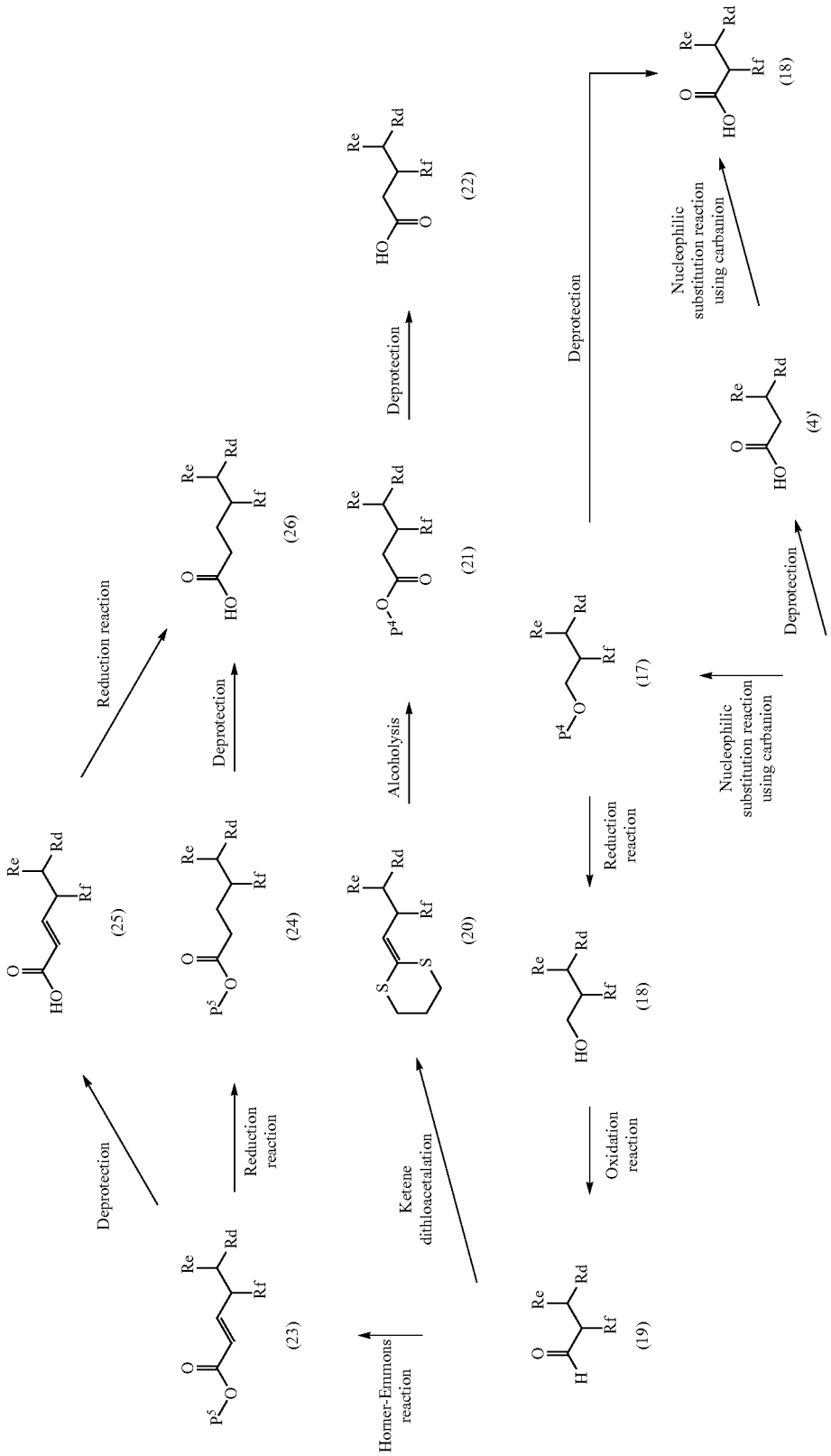

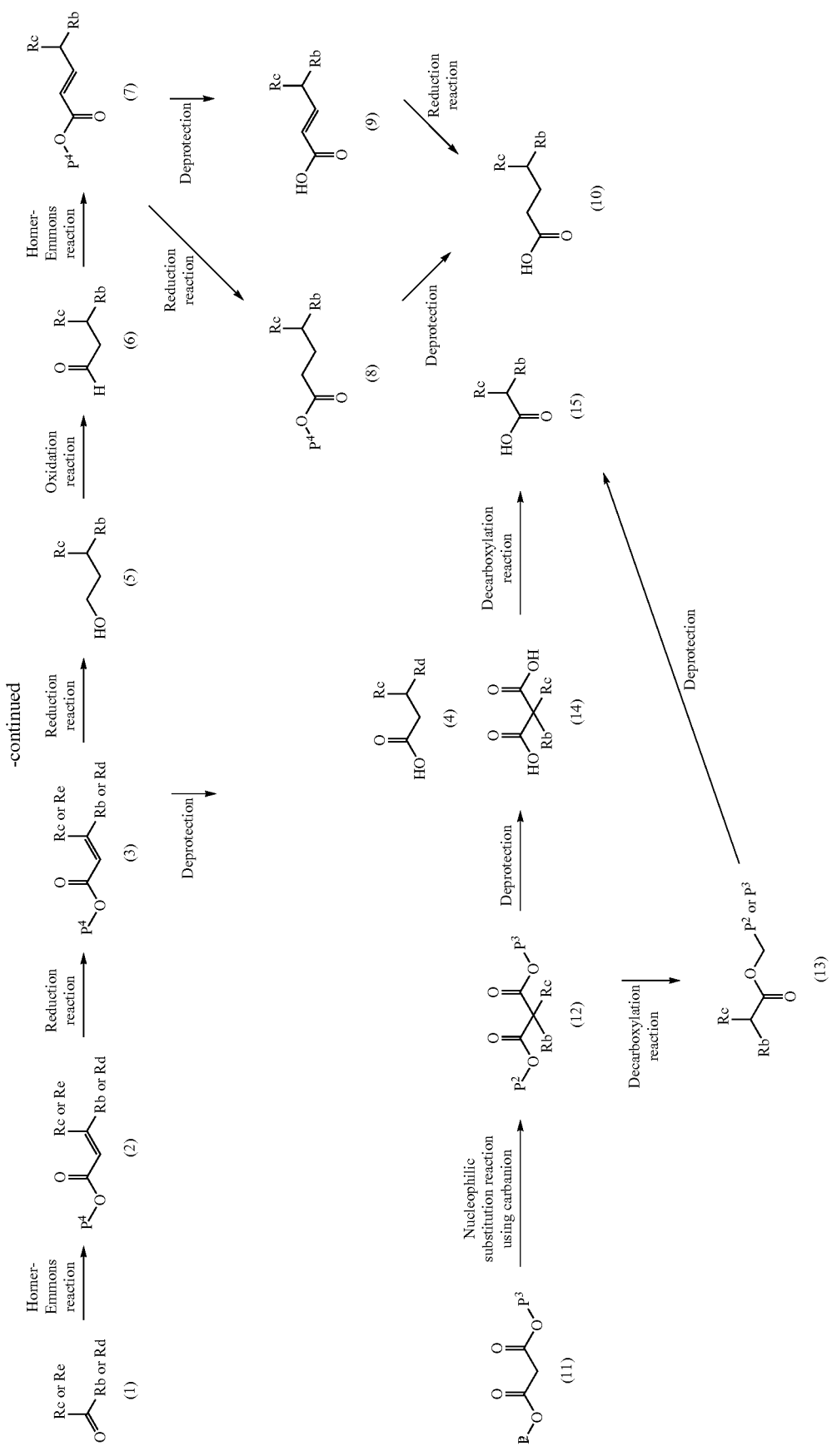

[Formula 4-4]

In the formulas described above, $P^1$, $P^2$, $P^3$, $P^4$, $P^5$ and $P^6$ each independently represent a protective group, compound (A) represents the formula:

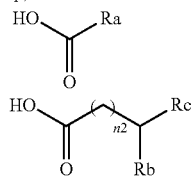

compound (B) represents the formula:

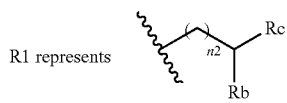

R1 represents compound (C) represents the formula:

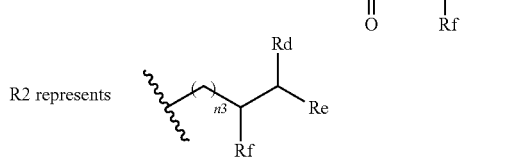

R2 represents

Hereinafter, methods for producing a lipid particle containing the compound of the present invention, and a composition for nucleic acid transfer (transfection) containing the lipid particle and a nucleic acid as an active ingredient will be described.

The lipid particle of the present invention can be produced by a known method for preparing lipid particles from lipid components after mixing of the compound of the present invention as a cationic lipid, if necessary, with an additional lipid component. For example, the (mixed) lipid component described above is dissolved in an organic solvent, and the resulting solution in the organic solvent can be mixed (e.g., by an emulsification method) with water or a buffer solution to produce a lipid particle dispersion. The mixing can be performed using a microfluidic mixing system (e.g., Nano-Assemblr apparatus (Precision NanoSystems Inc.)). The obtained lipid particle may be subjected to desalting or dialysis and sterile filtration. If necessary, pH adjustment or osmotic pressure adjustment may be carried out.

The compound (I) may assume a plurality of structures by combinations of definitions of n1, n2, n3, L, Ra, Rb, Rc, Rd, Re, and Rf in the formula (I). In the production of the lipid particle, one type of compound having a specific structure may be used as the compound (I), or plural types of compounds differing in structure may be used as a mixture.

Examples of the "additional lipid component" include the structured lipids mentioned above, for example, sterols, phospholipids, and polyethylene glycol lipids. The "additional lipid component" is used at, for example, 0.008 to 4 mol, based on 1 mol of the compound of the present invention. The compound of the present invention is preferably mixed, for use, with the additional lipid component (particularly, cholesterol, phosphatidylcholine and polyethylene glycol lipid). In the case of using the compound of the present invention and an additional lipid component in a mixture, a preferred embodiment is a mixture of 1 to 4 mol of the compound of the present invention, 0 to 3 mol of the sterol, 0 to 2 mol of the phospholipid and 0 to 1 mol of the polyethylene glycol lipid. In the case of using the compound of the present invention and an additional lipid component in a mixture, a more preferred embodiment is a mixture of 1 to 1.5 mol of the compound of the present invention, 0 to 1.25 mol of the sterol, 0 to 0.5 mol of the phospholipid and 0 to 0.125 mol of the polyethylene glycol lipid.

The concentration of the compound of the present invention or the mixture of the compound of the present invention with the additional lipid component in the solution in the organic solvent described above is preferably 0.5 to 100 mg/mL.

Examples of the organic solvent include methanol, ethanol, 1-propanol, 2-propanol, 1-butanol, tert-butanol, acetone, acetonitrile, N,N-dimethylformamide, dimethyl sulfoxide, and mixtures thereof. The organic solvent may contain 0 to 20% of water or a buffer solution.

Examples of the buffer solution include acidic buffer solutions (e.g., an acetate buffer solution, a citrate buffer solution, a 2-morpholinoethanesulfonic acid (MES) buffer solution, and a phosphate buffer solution), and neutral buffer solutions (e.g., a 4-(2-hydroxyethyl)-1-piperazineethanesulfonic acid (HEPES) buffer solution, a tris(hydroxymethyl)aminomethane (Tris) buffer solution, a phosphate buffer solution, and phosphate-buffered saline (PBS)).

In the case of carrying out the mixing using a microfluidic mixing system, 1 to 5 parts by volume of water or a buffer solution are preferably mixed with 1 part by volume of the solution in the organic solvent. In the system, the flow rate of the mixed solution (the mixed solution of the solution in the organic solvent with water or the buffer solution) is, for example, 0.01 to 20 mL/min, preferably 0.1 to 10 mL/min, and the temperature is, for example, 5 to 60° C., preferably 15 to 45° C.

The composition of the present invention can be produced as a lipid particle dispersion containing a nucleic acid by adding the nucleic acid to water or a buffer solution for the production of the lipid particle or a lipid particle dispersion. The nucleic acid is preferably added such that the concentration of the nucleic acid in water or the buffer solution is, for example, 0.01 to 20 mg/mL, preferably 0.05 to 2.0 mg/mL.

Alternatively, the composition of the present invention may be produced as a lipid particle dispersion containing an active ingredient by mixing the lipid particle or a lipid particle dispersion with the nucleic acid or an aqueous solution thereof by a known method. The lipid particle dispersion can be prepared by dispersing the lipid particle in an appropriate dispersion medium. The aqueous solution of the active ingredient can be prepared by dissolving the active ingredient in an appropriate solvent.

The content of the compound of the present invention in the composition of the present invention excluding the dispersion medium and the solvent is usually 10 to 70% by weight, preferably 40 to 70% by weight.

The content of the nucleic acid in the composition of the present invention excluding the dispersion medium and the solvent is usually 0.1 to 25% by weight, preferably 1 to 20% by weight.

The dispersion medium in the lipid particle dispersion or the dispersion containing the composition can be replaced with water or a buffer solution by dialysis. The dialysis is carried out at 4° C. to room temperature using an ultrafiltration membrane having a molecular weight cutoff of 10 to 20 K. The dialysis may be performed repetitively. The replacement of the dispersion medium may employ tangential flow filtration (TFF). After the replacement of the dispersion medium, if necessary, pH adjustment or osmotic pressure adjustment may be carried out. Examples of the pH adjuster include sodium hydroxide, citric acid, acetic acid, triethanolamine, sodium hydrogen phosphate, sodium dihydrogen phosphate, and potassium dihydrogen phosphate. Examples of the osmotic pressure adjuster include: inorganic salts such as sodium chloride, potassium chloride, sodium hydrogen phosphate, potassium hydrogen phosphate, sodium dihydrogen phosphate, and potassium dihydrogen phosphate; polyols such as glycerol, mannitol, and sorbitol; and sugars such as glucose, fructose, lactose, and sucrose. The pH is usually adjusted to 6.5 to 8.0, preferably 7.0 to 7.8. The osmotic pressure is preferably adjusted to 250 to 350 Osm/kg.

The composition of the present invention may contain, if necessary, a component other than the lipid particle and the nucleic acid. Examples of such a component include appropriate amounts of a stabilizer and an antioxidant.

Examples of the stabilizer include, but are not particularly limited to, sugars such as glycerol, mannitol, sorbitol, lactose, and sucrose.

Examples of the antioxidant include ascorbic acid, uric acid, cysteine, tocopherol homologs (vitamin E, four isomers tocopherol α, β, γ, and δ, etc.), EDTA, and cysteine.

Hereinafter, methods for analyzing a lipid particle containing the compound of the present invention, and a composition containing the lipid particle and a nucleic acid as an active ingredient will be described.

The particle size of the lipid particle (in the composition) can be measured by a known approach. For example, the particle size can be calculated as a Z-average particle size by the cumulant analysis of an autocorrelation function using a particle size measurement apparatus Zetasizer Nano ZS (Malvern Instruments) based on a dynamic light scattering measurement technique. The particle size (average particle size) of the lipid particle (in the composition) is, for example, 10 to 200 nm, preferably 60 to 170 nm.

The concentration and rate of encapsulation of the nucleic acid (e.g., siRNA or mRNA) in the composition of the present invention can be measured by a known approach. For example, the nucleic acid is fluorescently labeled using Quant-iT™ RiboGreen® (Invitrogen Corp.), and the fluorescence intensity can be measured to determine the concentration and the rate of encapsulation. The concentration of the nucleic acid in the composition can be calculated using a calibration curve prepared from aqueous nucleic acid solutions having known concentrations. The rate of encapsulation can be calculated on the basis of the difference in fluorescence intensity between the presence and absence of addition of Triton-X 100 (surfactant for disrupting the lipid particle). The concentration of the nucleic acid in the composition refers to the total concentration of a nucleic acid encapsulated in the lipid particle and an unencapsulated nucleic acid. The rate of encapsulation refers to the ratio of the nucleic acid encapsulated in the lipid particle to all nucleic acids in the composition.

EXAMPLES

The present invention will be described in more detail with reference to Examples, Production Examples and Test Examples given below. However, the present invention is not limited by these examples. Changes or modifications may be made therein without departing from the scope of the present invention.

In the examples given below, the term "room temperature" usually refers to a temperature of approximately 10° C. to approximately 35° C. The ratio shown in a mixed solvent refers to a volume ratio, unless otherwise specified. The term "%" refers to % by weight, unless otherwise specified.

In the examples, elution for column chromatography was performed under observation by TLC (thin layer chromatography), unless otherwise specified. In the TLC observation, 60 $F_{254}$ manufactured by Merck KGaA was used as a TLC plate, and a solvent used as an eluting solvent in column chromatography was used as a developing solvent. Detection adopted a UV detector, and a TLC chromogenic reagent was used, if necessary, for observation. In silica gel column chromatography, the term "NH" means that an aminopropylsilane-bound silica gel was used, and the term "Diol" means that a 3-(2,3-dihydroxypropoxy)propylsilane-bound silica gel was used. In preparative HPLC (high-performance liquid chromatography), the term "C18" means that an octadecyl-bound silica gel was used. The ratio shown in an eluting solvent refers to a volume ratio, unless otherwise specified.

$^1$H NMR was measured by Fourier transform NMR. $^1$H NMR was analyzed using ACD/SpecManager (trade name) software or the like. Very gentle peaks of protons of, for example, a hydroxyl group and an amino group may not be described.

MS was measured by LC/MS and MALDI/TOFMS. ESI, APCI, or MALDI was used as an ionization method. CHCA was used as a matrix. Measured values (Found) are shown in data. A molecular ion peak is usually observed. However, the peak observed may be of a fragment ion. For a salt, the peak observed is usually of a free molecular ion, a cationic species, an anionic species or a fragment ion.

The following abbreviations are used in the examples given below.

MS: mass spectrum
M: molar concentration
N: normality
$CDCl_3$: deuterated chloroform
DMSO-$d_6$: deuterated dimethyl sulfoxide
$^1$H NMR: proton nuclear magnetic resonance
LC/MS: liquid chromatograph-mass spectrometer
ESI: electrospray ionization
APCI: atmospheric pressure chemical ionization
MALDI: matrix-assisted laser desorption/ionization
TOFMS: time-of-flight mass spectrometry
CHCA: α-cyano-4-hydroxycinnamic acid
DMF: N,N-dimethylformamide
THF: tetrahydrofuran
DMAP: 4-dimethylaminopyridine
TBAF: tetrabutyl ammonium fluoride
DIBAL-H: diisobutyl aluminum hydride
DBU: 1,8-diazabicyclo[5,4,0]undec-7-ene

Example 1

3-((5-(Dimethylamino)pentanoyl)oxy)-2,2-bis((octanoyloxy)methyl)propyl 4-heptylundecanoate A) 2-Heptylnonanoic acid methyl ester Under nitrogen stream and ice cooling, a suspension of 60% sodium hydride (containing mineral oil) (3.78 g) in dehydrated DMF (100 mL) was stirred for 10 minutes. Then, dimethyl malonate (5.0 g) was added dropwise thereto at 10° C. or lower. After stirring at the same temperature as above for 10 minutes, 1-iodoheptane (18.3 mL) was added dropwise thereto, and the mixture was warmed to room temperature. 4 hours later, the reaction mixture was neutralized with 6 N hydrochloric acid, then diluted with ethyl acetate, washed twice with saturated brine, and then dried over anhydrous sodium sulfate. The solvent was distilled off under reduced pressure. The residue was dissolved in DMSO (75 mL). To the solution, water (0.68 mL) and lithium chloride (3.21 g) were added, and the mixture was warmed to 165° C. After stirring at the same temperature as above for 16 hours, water was added thereto, and the mixture was diluted with ethyl acetate. The dilution was washed twice with saturated brine and then dried over anhydrous sodium sulfate. The solvent was distilled off under reduced pressure. The residue was purified by silica gel column chromatography (ethyl acetate/hexane) to obtain the title compound (8.14 g).

$^1$H NMR (500 MHz, CDCl$_3$) δ ppm 0.84-0.90 (6H, m), 1.20-1.32 (20H, m), 1.36-1.47 (2H, m), 1.54-1.62 (2H, m), 2.33 (1H, tt, J=9.0, 5.4 Hz), 3.67 (3H, s)

B) 2-Heptylnonan-1-ol

Under nitrogen stream and ice cooling, a solution of 2-heptylnonanoic acid methyl ester (7.67 g) in dehydrated THF (50 mL) was added dropwise to a suspension of lithium aluminum hydride (2.15 g) in dehydrated THF (92 mL), and the mixture was stirred at 10° C. or lower for 1 hour. Then, the reaction mixture was warmed to room temperature and stirred for 3 hours. After cooling to 10° C. or lower again, sodium sulfate decahydrate was added thereto in small portions. After dilution with ethyl acetate, insoluble matter was filtered through celite. The solvent was distilled off under reduced pressure to obtain the title compound (6.91 g).

$^1$H NMR (500 MHz, CDCl$_3$) δ ppm 0.86-0.91 (6H, m), 1.16-1.34 (25H, m), 1.41-1.49 (1H, m), 3.54 (2H, t, J=5.2 Hz)

C) 2-Heptylnonanal

Under nitrogen stream, a solution of oxalyl chloride (4.9 mL) in dichloromethane (30 mL) was cooled to −70° C., and a solution of dimethyl sulfoxide (6.1 mL) in dichloromethane (30 mL) was added dropwise thereto while −60° C. or lower was kept. After stirring at −70° C. for 15 minutes, a solution of 2-heptylnonan-1-ol (6.9 g) in dichloromethane (25 mL) was added dropwise thereto while −60° C. or lower was kept. After stirring at −70° C. for 2 hours, triethylamine (23.8 mL) was added thereto, and the mixture was warmed to room temperature. The reaction mixture was subjected to liquid separation operation by the addition of a saturated aqueous solution of ammonium chloride and then dried over anhydrous sodium sulfate. Then, the solvent was distilled off under reduced pressure. The residue was purified by silica gel column chromatography (ethyl acetate/hexane) to obtain the title compound (6.06 g).

$^1$H NMR (500 MHz, CDCl$_3$) δ ppm 0.85-0.92 (6H, m), 1.19-1.33 (20H, m), 1.37-1.47 (2H, m), 1.56-1.65 (2H, m), 2.18-2.25 (1H, m), 9.55 (1H, d, J=3.2 Hz)

D) Ethyl-4-heptylundec-2-enoate

Under nitrogen stream and ice cooling, a suspension of 60% sodium hydride (containing mineral oil) (1.4 g) in dehydrated THF (70 mL) was stirred for 10 minutes. Then, ethyl(diethoxyphosphoryl)acetate (16.8 g) was added dropwise thereto at 10° C. or lower. After stirring at the same temperature as above for 10 minutes, a solution of 2-heptylnonanal (6.0 g) in dehydrated THF (60 mL) was added dropwise thereto, and the mixture was warmed to room temperature. The reaction mixture was stirred for a while and then warmed to 50° C. After stirring for 6 hours, the reaction mixture was brought to 5° C. or lower, and after addition of water, diluted with ethyl acetate, washed twice with saturated brine, and then dried over anhydrous sodium sulfate. The solvent was distilled off under reduced pressure. The residue was purified by silica gel column chromatography (ethyl acetate/hexane) to obtain the title compound (5.4 g).

$^1$H NMR (500 MHz, CDCl$_3$) δ ppm 0.87 (6H, t, J=6.0 Hz), 1.16-1.34 (25H, m), 1.37-1.45 (2H, m) 2.07-2.15 (1H, m), 4.19 (2H, q, J=7.5 Hz), 5.75 (1H, d, J=16.0 Hz), 6.75 (1H, dd, J=16.0, 10.0 Hz)

E) 4-Heptylundecanoic acid

To a solution of ethyl-4-heptylundec-2-enoate (5.40 g) in ethanol (100 mL), 10% Pd carbon (1.08 g) was added at room temperature, and the mixture was stirred for 20 hours in a hydrogen atmosphere. After reaction, Pd carbon was filtered off. Then, the solvent was distilled off under reduced pressure. To the obtained residue, a solution of an 8 N aqueous sodium hydroxide solution (6.38 mL) in ethanol (20 mL) was added, and the mixture was stirred at 60° C. for 5 hours. The solvent was distilled off under reduced pressure. Then, the residue was rendered acidic with 6 N hydrochloric acid. The residue was diluted with hexane, washed once with saturated brine, and then dried over anhydrous sodium sulfate. The solvent was distilled off under reduced pressure to obtain the title compound (4.73 g).

$^1$H NMR (500 MHz, CDCl$_3$) δ ppm 0.88 (6H, t, J=7.5 Hz), 1.17-1.41 (25H, m), 1.16-1.34 (2H, m), 2.22-2.34 (2H, m)

F) 2-(((tert-Butyl(diphenyl)silyl)oxy)methyl)-2-(hydroxymethyl)propane-1,3-diol To a mixture of 2,2-bis(hydroxymethyl)propane-1,3-diol (5.0 g), 1H-imidazole (2.5 g) and DMF (200 mL), a solution of tert-butylchlorodiphenylsilane (5.1 g) in DMF (10 mL) was added at room temperature. After stirring for 18 hours, the reaction mixture was concentrated under reduced pressure. The residue was diluted with ethyl acetate, washed three times with water and once with saturated brine, and then dried over anhydrous sodium sulfate. The solvent was distilled off under reduced pressure. The residue was purified by silica gel column chromatography (ethyl acetate/hexane) to obtain the title compound (6.4 g).

$^1$H NMR (500 MHz, CDCl$_3$) δ ppm 1.07 (9H, s), 2.34 (3H, t, J=5.5 Hz), 3.67 (2H,$), 3.74 (6H, d, J=5.7 Hz), 7.39-7.48 (6H, m), 7.63-7.67 (4H, m)

G) (5-(((tert-Butyl(diphenyl)silyl)oxy)methyl)-2,2-dimethyl-1,3-dioxan-5-yl)methanol To a solution of 2-(((tert-butyl(diphenyl)silyl)oxy)methyl)-2-(hydroxymethyl)propane-1,3-diol (3.5 g) and 2,2-dimethoxypropane (1.5 g) in acetone (35 mL), p-toluenesulfonic acid monohydrate (89 mg) was added at room temperature. After stirring for 2 hours, the reaction mixture was neutralized by the addition of dilute ammonia water. Then, the solvent was distilled off under reduced pressure. The residue was purified by silica gel column chromatography (ethyl acetate/hexane) to obtain the title compound (2.7 g).

$^1$H NMR (500 MHz, CDCl$_3$) δ ppm 1.07 (9H, s), 1.27 (3H, s), 1.41 (3H, s), 2.12-2.18 (1H, m), 3.69-3.78 (8H, m), 7.38-7.47 (6H, m), 7.65-7.69 (4H, m)

H) (5-(Hydroxymethyl)-2,2-dimethyl-1,3-dioxan-5-yl)methyl 4-heptylundecanoate To a solution of (5-(((tert-butyl(diphenyl)silyl)oxy)methyl)-2,2-dimethyl-1,3-dioxan-5-yl)methanol (3.56 g), DMAP (1.37 g) and 4-heptylundecanoic acid (3.18 g) in DMF (30 mL), 1-ethyl-3-(3-dimethylaminopropyl)carbodiimide hydrochloride (2.47 g) was added at 50° C. After stirring for 6 hours, ethyl acetate was added to the reaction mixture, and the mixture was washed once with water and once with saturated brine and then dried over anhydrous sodium sulfate. Then, the solvent was distilled off under reduced pressure. To a solution of the obtained residue (6.15 g) in THF (20 mL), a solution of TBAF in THF (1 M, 10.3 mL) was added at room temperature. After stirring for 4 hours, the reaction mixture was concentrated under reduced pressure. The residue was diluted with ethyl acetate, washed once with water and once with saturated brine, and then dried over anhydrous sodium sulfate. The solvent was distilled off under reduced pressure. The residue was purified by silica gel column chromatography (ethyl acetate/hexane) to obtain the title compound (2.34 g).

$^1$H NMR (500 MHz, CDCl$_3$) δ ppm 0.88 (6H, t, J=6.9 Hz), 1.22-1.32 (25H, m), 1.42 (6H, s), 1.57-1.62 (2H, m), 2.30-2.35 (2H, m), 3.48 (2H, d, J=6.6 Hz), 3.71-3.73 (4H, m), 4.25 (2H, s)

I) (5-(((5-Dimethylamino)pentanoyl)oxy)methyl)-2,2-dimethyl-1,3-dioxan-5-yl)methyl 4-heptylundecanoate To a solution of (5-(hydroxymethyl)-2,2-dimethyl-1,3-dioxan-5-yl)methyl 4-heptylundecanoate (1.2 g), DMAP (0.94 g) and 5-(dimethylamino)pentanoic acid hydrochloride (0.74 g) in DMF (30 mL), 1-ethyl-3-(3-dimethylaminopropyl)carbodiimide hydrochloride (0.94 g) was added at 40° C. After stirring for 4 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (NH, ethyl acetate/hexane) to obtain the title compound (1.37 g).

$^1$H NMR (500 MHz, CDCl$_3$) δ ppm 0.88 (6H, t, J=6.9 Hz), 1.20-1.32 (25H, m), 1.42 (6H, s), 1.45-1.52 (2H, m), 1.54-1.67 (4H, m), 2.21 (6H, s), 2.23-2.31 (4H, m), 2.35 (2H, t, J=7.5 Hz), 3.75 (4H, s), 4.11 (2H, s), 4.12 (2H, s)

J) 3-((5-(Dimethylamino)pentanoyl)oxy)-2,2-bis((octanoyloxy)methyl)propyl 4-heptylundecanoate To (5-(((5-dimethylamino)pentanoyl)oxy)methyl)-2,2-dimethyl-1,3-dioxan-5-yl)methyl 4-heptylundecanoate (1.37 g), acetic acid (6.85 mL) and water (3.43 mL) were added, and the mixture was stirred at 70° C. for 2 hours. Then, the solvent was distilled off under reduced pressure. Ethyl acetate and a saturated aqueous solution of sodium bicarbonate were added to the residue, and the mixture was stirred for 2 hours. The reaction mixture was washed twice with water and then dried over anhydrous sodium sulfate. Then, the solvent was distilled off under reduced pressure. To the obtained residue (400 mg), a solution of DMAP (478 mg) and octanoic acid (327 mg) in DMF (4 mL) was added, and then, 1-ethyl-3-(3-dimethylaminopropyl)carbodiimide hydrochloride (478 mg) was added at 50° C. After stirring for 4 hours, ethyl acetate was added to the reaction mixture, and the mixture was washed twice with a saturated aqueous solution of sodium carbonate and once with saturated brine and then dried over anhydrous sodium sulfate. Then, the solvent was distilled off under reduced pressure. The residue was purified by silica gel column chromatography (NH, ethyl acetate/hexane) to obtain the title compound (300 mg).

$^1$H NMR (500 MHz, CDCl$_3$) δ ppm 0.86-0.91 (12H, m), 1.15-1.34 (45H, m), 1.45-1.52 (2H, m), 1.53-1.66 (4H, m), 2.20 (6H, s), 2.23-2.36 (10H, m), 4.11 (8H, s)

Example 8

2-(((6-(Dimethylamino)hexanoyl)oxy)methyl-2-((octanoyloxy)methyl)propane-1,3-diyl bis(2-hexyloctanoate)

A) 2-Hexyloctanoic acid

Under nitrogen stream and ice cooling, a suspension of 60% sodium hydride (containing mineral oil) (3.78 g) in dehydrated DMF (90 mL) was stirred for 10 minutes. Then, dimethyl malonate (5.0 g) was added dropwise thereto at 10° C. or lower. After stirring at the same temperature as above for 10 minutes, 1-iodohexane (16.8 mL) was added dropwise thereto, and the mixture was warmed to room temperature. 8 hours later, acetic acid (1 mL) was added to the reaction mixture. Then, the mixture was diluted with ethyl acetate, washed twice with water and once with saturated brine, and then dried over anhydrous sodium sulfate. The solvent was distilled off under reduced pressure. The residue was dissolved in EtOH (80 mL). To the solution, an 8 N aqueous sodium hydroxide solution (25 mL) was added, and the mixture was stirred at 60° C. for 6 hours. The reaction mixture was neutralized with 6 N hydrochloric acid, then diluted with ethyl acetate, washed with saturated brine, and then dried over anhydrous sodium sulfate. The solvent was distilled off under reduced pressure. The residue was heated at 160° C. for 1.5 hours, cooled to room temperature, and then purified by silica gel column chromatography (ethyl acetate/hexane) to obtain the title compound (7.45 g).

$^1$H NMR (500 MHz, CDCl$_3$) δ ppm 0.83-0.92 (6H, m), 1.22-1.35 (16H, m), 1.38-1.52 (2H, m), 1.56-1.67 (2H, m), 2.34 (1H, ddd, J=8.7, 5.4, 3.3 Hz)

B) (2-(4-Methoxyphenyl)-1,3-dioxane-5,5-diyl)dimethanol

A solution of 2,2-bis(hydroxymethyl)propane-1,3-diol (506 g) in water (2.0 L) was stirred at 50° C. Concentrated hydrochloric acid (18 mL) was added thereto, and p-methoxybenzaldehyde (474 mL) was added dropwise thereto around 30° C. over 3 hours. Then, the reaction solution was brought to 25° C. and stirred for 5 hours. A 2 N aqueous sodium hydroxide solution (120 mL) was added thereto, and the mixture was stirred for 1 hour. Crystals were filtered, washed with water, and then recrystallized with ethyl acetate/hexane to obtain the title compound (769 g).

$^1$H NMR (500 MHz, DMSO-d$_6$) δ ppm 3.24 (2H, d, J=5.0 Hz), 3.67 (2H, d, J=5.4 Hz), 3.74 (3H, s), 3.77 (2H, d, J=11.3 Hz), 3.88 (2H, t, J=11.3 Hz), 4.53 (1H, t, J=5.4 Hz), 4.62 (1H, t, J=5.0 Hz), 5.34 (1H, s), 6.90 (2H, d, J=8.9 Hz), 7.33 (2H, d, J=8.9 Hz)

C) 9-(4-Methoxyphenyl)-3,3-dimethyl-2,4,8,10-tetraoxaspiro[5.5]undecane

To a solution of (2-(4-methoxyphenyl)-1,3-dioxane-5,5-diyl)dimethanol (2.00 g) and 2,2-dimethoxypropane (2.46 g)

in DMF (8 mL), pyridinium p-toluenesulfonate (20 mg) was added at room temperature. After stirring for 4 hours, the reaction mixture was diluted with ethyl acetate, washed twice with a saturated aqueous solution of sodium bicarbonate and twice with saturated brine, and then dried over anhydrous magnesium sulfate. Then, the solvent was distilled off under reduced pressure. The residue was recrystallized with ethyl acetate/hexane to obtain the title compound (1.62 g).

$^1$H NMR (500 MHz, DMSO-$d_6$) δ ppm 1.34 (6H, s), 3.33 (2H, s), 3.63 (2H, d, J=11.7 Hz), 3.74 (3H, s), 3.99 (2H, s), 4.12 (2H, d, J=11.7 Hz), 5.37 (1H, s), 6.90(2H, d, J=8.8 Hz), 7.34 (2H, d, J=8.8 Hz)

D) (5-(((4-Methoxybenzyl)oxy)methyl)-2,2-dimethyl-1,3-dioxan-5-yl)methanol

To a suspension of 9-(4-methoxyphenyl)-3,3-dimethyl-2,4,8,10-tetraoxaspiro[5.5]undecane (22.0 g) in toluene (200 mL), a 1.5 M DIBAL-H solution (60 mL) was added dropwise at 5 to 20° C., and the mixture was stirred at 15° C. for 3 hours. Methanol (22 mL) was added thereto, and then, a 2 N aqueous sodium hydroxide solution (100 mL) and a 4 N aqueous sodium hydroxide solution (200 mL) were added dropwise thereto in order. After stirring for 1.5 hours, the toluene layer was separated and washed with 5% brine. The solvent was distilled off under reduced pressure. The residue was purified by silica gel column chromatography (ethyl acetate/hexane) to obtain the title compound (14.7 g).

$^1$H NMR (500 MHz, DMSO-$d_6$) δ ppm 1.29 (3H, s), 1.29 (3H, s), 3.35 (2H, s), 3.39 (2H, d, J=5.1 Hz), 3.61 (4H, s), 3.74 (3H, s), 4.38 (2H, s), 4.59 (1H, t, J=5.1 Hz), 6.90 (2H, d like, J=7.5 Hz), 7.24 (2H, d like, J=7.5 Hz)

E) (5-(((4-Methoxybenzyl)oxy)methyl)-2,2-dimethyl-1,3-dioxan-5-yl)methyloctanoate To a solution of (5-(((4-methoxybenzyl)oxy)methyl)-2,2-dimethyl-1,3-dioxan-5-yl)methanol (2.00 g), DMAP (412 mg) and octanoic acid (1.27 g) in DMF (20 mL), 1-ethyl-3-(3-dimethylaminopropyl)carbodiimide hydrochloride (1.94 g) was added at 50° C. After stirring for 4 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (2.78 g).

$^1$H NMR (500 MHz, CDCl$_3$) δ ppm 0.84-0.91 (3H, m), 1.22-1.33 (8H, m), 1.40 (6H, s), 1.53-1.61 (2H, m), 2.26 (2H, t, J=7.6 Hz), 3.39 (2H, s), 3.68-3.74 (2H, m), 3.76-3.80 (2H, m), 3.80 (3H, s), 4.15 (2H, s), 4.42 (2H, s), 6.87 (2H, d, J=7.8 Hz), 7.20-7.24 (2H, m)

F) 3-Hydroxy-2-(hydroxymethyl)-2-(((4-methoxybenzyl)oxy)methyl)propyl octanoate To a solution of (5-(((4-methoxybenzyl)oxy)methyl)-2,2-dimethyl-1,3-dioxan-5-yl)methyloctanoate (754 mg) in THF (6 mL), 1 N hydrochloric acid (6 mL) was added, and the mixture was stirred at room temperature for 6 hours. A saturated aqueous solution of sodium bicarbonate or a 2 N aqueous sodium hydroxide solution (4 mL) was added thereto, followed by extraction with ethyl acetate. The extracts were washed with water and saturated brine. This series of operations was repeated four times until completion of deprotection. After the completion of reaction, the solvent was distilled off under reduced pressure to obtain the title compound (608 mg).

$^1$H NMR (500 MHz, DMSO-$d_6$) δ ppm 0.85 (3H, t, J=7.3 Hz), 1.15-1.30 (9H, m), 1.40-1.50 (2H, m), 2.22 (2H, t, J=7.5 Hz), 3.31 (2H, s), 3.39 (4H, d, J=5.4 Hz), 3.76 (3H, s), 3.95 (2H, s), 4.35 (2H, s), 4.43 (2H, t, J=5.4 Hz), 6.89 (2H, d, J=6.6 Hz), 7.21 (2H, d, J=6.6 Hz)

G) 2-(((4-Methoxybenzyl)oxy)methyl)-2-((octanoyloxy)methyl)propane-1,3-diyl bis(2-hexyloctanoate)

To a solution of 3-hydroxy-2-(hydroxymethyl)-2-(((4-methoxybenzyl)oxy)methyl)propyl octanoate (2.0 g), DMAP (0.64 g) and 2-hexyloctanoic acid (2.63 g) in DMF (20 mL), 1-ethyl-3-(3-dimethylaminopropyl)carbodiimide hydrochloride (2.41 g) was added at room temperature. After stirring at room temperature for 15 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (3.48 g).

$^1$H NMR (500 MHz, CDCl$_3$) δ ppm 0.83-0.91 (15H, m), 1.19-1.33 (42H, m), 1.37-1.47 (4H, m), 1.51-1.61 (4H, m), 2.24 (2H, t, J=7.6 Hz), 2.32 (2H, br t, J=5.4 Hz), 3.41 (2H, s), 3.80 (3H, s), 4.08-4.16 (6H, m), 4.39 (2H, s), 6.86 (2H, d, J=7.6 Hz), 7.19 (2H, d, J=8.8 Hz)

H) 2-(Hydroxymethyl)-2-((octanoyloxy)methyl)propane-1,3-diyl bis(2-hexyloctanoate)

To a solution of 2-(((4-methoxybenzyl)oxy)methyl)-2-((octanoyloxy)methyl)propane-1,3-diylbis(2-hexyloctanoate) (3.48 g) in ethanol (30 mL), 10% Pd carbon (280 mg) was added at room temperature, and the mixture was stirred for 7 hours in a hydrogen atmosphere. After reaction, Pd carbon was filtered off. Then, the solvent was distilled off under reduced pressure. The residue was purified by silica gel column chromatography (ethyl acetate/hexane) to obtain the title compound (1.68 g).

$^1$H NMR (500 MHz, CDCl$_3$) δ ppm 0.84-0.91 (15H, m), 1.19-1.33 (42H, m), 1.41-1.51 (4H, m), 1.54-1.63 (4H, m), 2.30-2.38 (4H, m), 2.61-2.64 (1H, m), 3.48 (2H, d, J=7.3 Hz), 4.08-4.14 (6H, m)

I) 2-(((6-(Dimethylamino)hexanoyl)oxy)methyl-2-((octanoyloxy)methyl)propane-1,3-diyl bis(2-hexyloctanoate)

To a solution of 2-(hydroxymethyl)-2-((octanoyloxy) methyl)propane-1,3-diyl bis(2-hexyloctanoate) (600 mg), DMAP (54 mg) and 6-(dimethylamino)hexanoic acid (280 mg) in DMF (6 mL), 1-ethyl-3-(3-dimethylaminopropyl) carbodiimide hydrochloride (303 mg) was added at room temperature. After stirring at 40° C. for 15 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (NH, ethyl acetate/hexane) to obtain the title compound (513 mg).

$^1$H NMR (500 MHz, CDCl$_3$) δ ppm 0.83-0.92 (15H, m), 1.19-1.34 (42H, m), 1.39-1.50 (6H, m), 1.52-1.73 (8H, m), 2.21 (6H, s), 2.21-2.35 (8H, m), 4.10 (8H, s)

Example 10

3-((5-(Dimethylamino)pentanoyl)oxy)-2,2-bis((octanoyloxy)methyl)propyl 4,5-dibutylnonanoate

A) Ethyl 3-butylhept-2-enoate

Under nitrogen stream and ice cooling, a suspension of 60% sodium hydride (containing mineral oil) (3.94 g) in dehydrated THF (100 mL) was stirred for 10 minutes. Then, ethyl(diethoxyphosphoryl)acetate (23.7 g) was added dropwise thereto at 10° C. or lower. After stirring at the same temperature as above for 10 minutes, nonan-5-one (10.0 g) was added thereto, and the mixture was warmed to room temperature. The reaction mixture was stirred for a while and then warmed to 50° C. After stirring for 10 hours, the reaction mixture was brought to 5° C. or lower, and after addition of water, diluted with ethyl acetate, washed twice with saturated brine, and then dried over anhydrous sodium sulfate. The solvent was distilled off under reduced pressure. The residue was purified by silica gel column chromatography (ethyl acetate/hexane) to obtain the title compound (4.47 g).
$^1$H NMR (500 MHz, CDCl$_3$) δ ppm 0.92 (6H, td, J=7.3, 3.2 Hz), 1.25-1.47 (11H, m), 2.14 (2H, td, J=7.6, 1.1 Hz), 2.57-2.62 (2H, m), 4.14 (2H, q, J=7.1 Hz), 5.62 (1H, s)

B) Ethyl 3-butylheptanoate

To a solution of ethyl 3-butylhept-2-enoate (5.80 g) in ethanol (25 mL), 10% Pd carbon (1.50 g) was added at room temperature, and the mixture was stirred for 5 hours in a hydrogen atmosphere. After reaction, Pd carbon was filtered off. Then, the solvent was distilled off under reduced pressure to obtain the title compound (5.49 g).
$^1$H NMR (500 MHz, CDCl$_3$) δ ppm 0.84-0.93 (6H, m), 1.21-1.33 (15H, m), 1.80-1.88 (1H, m), 2.22 (2H, d, J=6.9 Hz), 4.12 (2H, q, J=7.1 Hz)

C) Ethyl 2,3-dibutylheptanoate

Under nitrogen stream, a solution of diisopropylamine (11.8 mL) in dehydrated THF (59 mL) was cooled to −10° C., and a 1.6 M solution of n-BuLi in hexane (35.2 mL) was gradually added dropwise thereto. After the completion of dropwise addition, the reaction solution was brought to 0° C. and stirred for 10 minutes. After cooling to −10° C. again, a solution of ethyl 3-butylheptanoate (5.49 g) in dehydrated THF (16 mL) was added dropwise thereto, and the mixture is stirred around −5° C. for 30 minutes. Then, 1-iodobutane (9.43 g) was added dropwise thereto, and the mixture was stirred for a while and then brought to room temperature. The reaction mixture was stirred for 3 hours, then neutralized with 6 N hydrochloric acid, then diluted with ethyl acetate, washed twice with a 10% aqueous sodium thiosulfate solution and once with saturated brine, and then dried over anhydrous sodium sulfate. The solvent was distilled off under reduced pressure. The residue was purified by silica gel column chromatography (ethyl acetate/hexane) to obtain the title compound (5.57 g).
$^1$H NMR (500 MHz, CDCl$_3$) δ ppm 0.84-0.93 (9H, m), 1.17-1.41 (20H, m), 1.51-1.65 (2H, m), 2.34 (1H, ddd, J=10.6, 6.5, 3.8 Hz), 4.07-4.19 (2H, m)

D) 2,3-Dibutylheptan-1-ol

Under nitrogen stream and ice cooling, a solution of ethyl 2,3-dibutylheptanoate (5.50 g) in dehydrated THF (10 mL) was added dropwise to a suspension of lithium aluminum hydride (1.54 g) in dehydrated THF (66 mL). After the completion of dropwise addition, the mixture was stirred for 10 minutes and brought back to room temperature. The reaction mixture was stirred for 2 hours and then cooled to 5° C. or lower, and sodium sulfate decahydrate was added thereto in small portions. After foaming was no longer seen, the mixture was diluted with ethyl acetate, and insoluble matter was filtered through celite. The solvent was distilled off under reduced pressure to obtain the title compound (4.67 g).
$^1$H NMR (500 MHz, CDCl$_3$) δ ppm 0.86-0.93 (9H, m), 1.12-1.34 (19H, m), 1.37-1.46 (1H, m), 1.47-1.61 (1H, m), 3.49-3.62 (2H, m)

E) 2,3-Dibutylheptanal

Under nitrogen stream, a solution of 2,3-dibutylheptan-1-ol (4.60 g) and DBU (6.02 mL) in dichloromethane (46 mL) was cooled to −10° C., and a solution of N-tert-butylbenzenesulfinimidoyl chloride (6.52 g) in dichloromethane (20 mL) was added dropwise thereto while −5° C. or lower was kept. The mixture was stirred at −10° C. for 3 hours and then rendered acidic with 1 N hydrochloric acid. After liquid separation operation, the solvent was distilled off under reduced pressure. The residue was diluted with ethyl acetate, washed once with saturated brine, and then dried over anhydrous sodium sulfate. The solvent was distilled off under reduced pressure. The residue was purified by silica gel column chromatography (ethyl acetate/hexane) to obtain the title compound (4.11 g).
$^1$H NMR (500 MHz, CDCl$_3$) δ ppm 0.83-0.96 (9H, m), 1.15-1.39 (16H, m), 1.52-1.60 (1H, m), 1.62-1.74 (2H, m), 2.22-2.27 (1H, m), 9.64 (1H, d, J=2.8 Hz)

F) Ethyl 4,5-dibutylnon-2-enoate

Under nitrogen stream and ice cooling, a suspension of 60% sodium hydride (containing mineral oil) (1.0 g) in dehydrated THF (41 mL) was stirred for 10 minutes. Then, ethyl(diethoxyphosphoryl)acetate (6.10 g) was added dropwise thereto at 10° C. or lower. After stirring at the same temperature as above for 10 minutes, a solution of 2,3-dibutylheptanal (4.10 g) in dehydrated THF (8 mL) was added dropwise thereto, and the mixture was warmed to room temperature. The reaction mixture was stirred for a while and then warmed to 50° C. After stirring for 5 hours, the reaction mixture was brought to 5° C. or lower, and after addition of water, diluted with ethyl acetate, washed twice with saturated brine, and then dried over anhydrous sodium sulfate. The solvent was distilled off under reduced pressure. The residue was purified by silica gel column chromatography (ethyl acetate/hexane) to obtain the title compound (4.14 g).
$^1$H NMR (500 MHz, CDCl$_3$) δ ppm 0.83-0.97 (9H, m), 1.14-1.38 (22H, m), 2.16-2.30 (1H, m), 4.10-4.22 (2H, m), 5.72-5.78 (1H, m), 6.80 (1H, dd, J=15.6, 9.6 Hz)

G) 4,5-Dibutylnon-2-enoic acid

A solution of ethyl 4,5-dibutylnon-2-enoate (4.10 g) and an 8 N aqueous sodium hydroxide solution (6.1 mL) in ethanol (30 mL) was stirred at 60° C. for 2 hours. The solvent was distilled off under reduced pressure, and the residue was rendered acidic with 1 N hydrochloric acid. The residue was diluted with ethyl acetate, washed twice with water and once with saturated brine, and then dried over anhydrous sodium sulfate. The solvent was distilled off under reduced pressure. The residue was purified by silica gel column chromatography (ethyl acetate/hexane) to obtain the title compound (2.80 g).

$^1$H NMR (500 MHz, CDCl$_3$) δ ppm 0.81-0.93 (9H, m), 1.06-1.47 (19H, m), 2.16-2.33 (1H, m), 5.75-5.80 (1H, m), 6.92 (1H, dd, J=15.8, 9.8 Hz)

H) 3-Hydroxy-2-(hydroxymethyl)-2-(((4-methoxybenzyl)oxy)methyl)propyl-4,5-dibutylnon-2-enoate To a solution of (5-(((4-methoxybenzyl)oxy)methyl)-2,2-dimethyl-1,3-dioxan-5-yl)methanol (600 mg), DMAP (240 mg) and 4,5-dibutylnon-2-enoic acid (706 mg) in DMF (4 mL), 1-ethyl-3-(3-dimethylaminopropyl)carbodiimide hydrochloride (582 mg) was added at room temperature. After stirring overnight, ethyl acetate was added to the reaction mixture, and the mixture was washed twice with water and once with saturated brine and then dried over anhydrous sodium sulfate. Then, the solvent was distilled off under reduced pressure. The obtained residue was dissolved in THF (12 mL). To the solution, 1 N hydrochloric acid (6 mL) was then added, and the mixture was stirred for 3 days. Ethyl acetate was added to the reaction mixture, and the mixture was washed twice with a 5% aqueous sodium bicarbonate solution and once with saturated brine and then dried over anhydrous sodium sulfate. Then, the solvent was distilled off under reduced pressure. The residue was purified by silica gel column chromatography (ethyl acetate/hexane) to obtain the title compound (870 mg).

$^1$H NMR (500 MHz, CDCl$_3$) δ ppm 0.84-0.93 (9H, m), 1.13-1.36 (18H, m), 1.40-1.47 (1H, m), 2.21 (1H, dt, J=9.3, 4.8 Hz), 2.69 (2H, td, J=6.6, 2.5 Hz), 3.48 (2H, s), 3.55-3.67 (4H, m), 3.80-3.82 (3H, m), 4.23-4.32 (2H, m), 4.45 (2H, s), 5.74-5.79 (1H, m), 6.82-6.91 (3H, m), 7.21-7.25 (2H, m)

I) 3-((4-Methoxybenzyl)oxy)-2,2-bis((octanoyloxy)methyl)propyl-4,5-dibutylnon-2-enoate To a solution of 3-hydroxy-2-(hydroxymethyl)-2-(((4-methoxybenzyl)oxy)methyl)propyl-4,5-dibutylnon-2-enoate (870 mg), DMAP (210 mg) and octanoic acid (545 mg) in DMF (6 mL), 1-ethyl-3-(3-dimethylaminopropyl)carbodiimide hydrochloride (757 mg) was added at room temperature. After stirring at 60° C. for 4 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (1.26 g).

$^1$H NMR (500 MHz, CDCl$_3$) δ ppm 0.83-0.93 (15H, m), 1.13-1.45 (35H, m), 1.52-1.61 (4H, m), 2.17-2.31 (5H, m), 3.43 (2H, s), 3.80 (3H, s), 4.10-4.22 (6H, m), 4.40 (2H, s), 5.73 (1H, d, J=15.4 Hz), 6.78-6.90 (3H, m), 7.19 (2H, d, J=7.9 Hz)

J) 3-((5-(Dimethylamino)pentanoyl)oxy)-2,2-bis((octanoyloxy)methyl)propyl 4,5-dibutylnonanoate To a solution of 3-((4-methoxybenzyl)oxy)-2,2-bis((octanoyloxy)methyl)propyl-4,5-dibutylnon-2-enoate (1.26 g) in a mixed solvent of ethanol (10 mL) and ethyl acetate (10 mL), 10% Pd carbon (110 mg) was added at room temperature, and the mixture was stirred overnight in a hydrogen atmosphere. After reaction, Pd carbon was filtered off. Then, the solvent was distilled off under reduced pressure. To a solution of the residue (500 mg), DMAP (95 mg) and 5-(dimethylamino)pentanoic acid hydrochloride (170 mg) in DMF (4 mL), 1-ethyl-3-(3-dimethylaminopropyl)carbodiimide hydrochloride (194 mg) was added at room temperature. After stirring at 50° C. for 7 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (NH, ethyl acetate/hexane) to obtain the title compound (250 mg).

$^1$H NMR (500 MHz, CDCl$_3$) δ ppm 0.84-0.91 (15H, m), 1.09-1.31 (37H, m), 1.42-1.52 (2H, m), 1.54-1.66 (6H, m), 1.76-1.97 (1H, m), 2.21 (6H, s), 2.24-2.35 (10H, m), 4.07-4.13 (8H, m)

Example 14

2-(((4,5-Dibutylnonanoyl)oxy)methyl)-2-(((5-(dimethylamino)pentanoyl)oxy)methyl)propane-1,3-diyl didecanoate A) Ethyl 4,5-dibutylnonanoate To a solution of ethyl 4,5-dibutylnon-2-enoate (2.50 g) in ethanol (20 mL), 10% Pd carbon (0.54 g) was added at room temperature, and the mixture was stirred for 5 hours in a hydrogen atmosphere. After reaction, Pd carbon was filtered off. Then, the solvent was distilled off under reduced pressure to obtain the title compound (2.49 g).

$^1$H NMR (500 MHz, CDCl$_3$) δ ppm 0.82-1.00 (9H, m), 1.10-1.33 (23H, m), 1.46-1.63 (2H, m), 2.19-2.36 (2H, m), 4.06-4.19 (2H, m)

B) 4,5-Dibutylnonanoic acid

A solution of ethyl 4,5-dibutylnonanoate (2.49 g) and an 8 N aqueous sodium hydroxide solution (3.55 mL) in ethanol (12.5 mL) was stirred at 60° C. for 7 hours. The solvent was distilled off under reduced pressure, and the residue was rendered acidic with 1 N hydrochloric acid. The residue was diluted with ethyl acetate, washed twice with water and once with saturated brine, and then dried over anhydrous sodium sulfate. The solvent was distilled off under reduced pressure to obtain the title compound (2.36 g).

$^1$H NMR (500 MHz, CDCl$_3$) δ ppm 0.83-0.94 (9H, m), 0.95-1.33 (20H, m), 1.49 (1H, ddt, J=13.7, 9.3, 6.8, 6.8 Hz), 1.56-1.74 (1H, m), 2.26-2.42 (2H, m)

C) (5-(Hydroxymethyl)-2,2-dimethyl-1,3-dioxan-5-yl)methyl 4,5-dibutylnonanoate

To a solution of (5-(((tert-butyl(diphenyl)silyl)oxy)methyl)-2,2-dimethyl-1,3-dioxan-5-yl)methanol (800 mg), DMAP (306 mg) and 4,5-dibutylnonanoic acid (678 mg) in DMF (8 mL), 1-ethyl-3-(3-dimethylaminopropyl)carbodiimide hydrochloride (555 mg) was added at room temperature. After stirring at 50° C. for 8 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane). To a solution of this compound in THF (4 mL), a solution of TBAF in THF (1 M, 2.32 mL) was added at room temperature. After stirring overnight at room temperature, the reaction mixture was concentrated under reduced pressure. The residue was diluted with ethyl acetate, washed once with a saturated aqueous solution of sodium bicarbonate and once with saturated brine, and then dried over anhydrous sodium sulfate. The solvent was distilled off under reduced pressure. The residue was purified by silica gel column chromatography (ethyl acetate/hexane) to obtain the title compound (680 mg).

$^1$H NMR (500 MHz, CDCl$_3$) δ ppm 0.89 (9H, t, J=6.8 Hz), 1.09-1.31 (20H, m), 1.42 (6H, s), 1.45-1.54 (1H, m), 1.57-1.62 (1H, m), 2.29-2.37 (3H, m), 3.48 (2H, d, J=6.6 Hz), 3.70-3.75 (4H, m), 4.25 (2H, d, J=1.9 Hz)

D) (5-(((5-(Dimethylamino)pentanoyl)oxy)methyl)-2,2-dimethyl-1,3-dioxan-5-yl)methyl 4,5-dibutylnonanoate To a solution of (5-(hydroxymethyl)-2,2-dimethyl-1,3-dioxan-5-yl)methyl 4,5-dibutylnonanoate (680 mg), DMAP (388 mg) and 5-(dimethylamino)pentanoic acid hydrochloride (576 mg) in DMF (7 mL), 1-ethyl-3-(3-dimethylaminopropyl)carbodiimide hydrochloride (669 mg) was added at room temperature. After stirring at 50° C. for 7 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (740 mg).

$^1$H NMR (500 MHz, CDCl$_3$) δ ppm 0.89 (9H, t, J=6.9 Hz), 1.09-1.31 (21H, m), 1.42 (6H, s), 1.48 (3H, dt, J=15.1, 7.6 Hz), 1.60-1.66 (2H, m), 2.21 (6H, s), 2.22-2.32 (4H, m), 2.35 (2H, t, J=7.6 Hz), 3.75 (4H, s), 4.09-4.13 (4H, m)

E) 2-(((4,5-Dibutylnonanoyl)oxy)methyl)-2-(((5-(dimethylamino)pentanoyl)oxy)methyl)propane-1,3-diyl didecanoate To (5-(((5-(dimethylamino)pentanoyl)oxy)methyl)-2,2-dimethyl-1,3-dioxan-5-yl)methyl 4,5-dibutylnonanoate (1.68 g), acetic acid (8.4 mL) and water (4.2 mL) were added, and the mixture was stirred at 75° C. for 2 hours. The solvent was distilled off under reduced pressure. Ethyl acetate and a saturated aqueous solution of sodium hydroxide were added to the residue, and the mixture was stirred for 2 hours. The organic layer was washed with a saturated aqueous solution of sodium hydroxide and saturated brine and then dried over anhydrous sodium sulfate. Then, the solvent was distilled off under reduced pressure. To a solution of the residue (700 mg), DMAP (497 mg) and decanoic acid (701 mg) in DMF (7 mL), 1-ethyl-3-(3-dimethylaminopropyl)carbodiimide hydrochloride (859 mg) was added at room temperature. After stirring at 50° C. for 7 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane, ethyl acetate/methanol and NH, ethyl acetate/hexane) to obtain the title compound (405 mg).

$^1$H NMR (500 MHz, CDCl$_3$) δ ppm 0.84-0.93 (15H, m), 1.10-1.32 (44H, m), 1.40-1.54 (3H, m), 1.54-1.66 (7H, m), 2.21 (6H, s), 2.23-2.35 (10H, m), 4.11 (8H, s)

Example 18

3-(((4-(Dimethylamino)butyl)carbamoyl)oxy)-2,2-bis((octanoyloxy)methyl)propyl 4,5-dibutylnonanoate To a solution of (5-(hydroxymethyl)-2,2-dimethyl-1,3-dioxan-5-yl)methyl 4,5-dibutylnonanoate (0.50 g) in tetrahydrofuran (7.5 mL), 1,1-carbonyldiimidazole (0.28 g) was added at room temperature. After stirring for 1 hour, the reaction mixture was concentrated under reduced pressure. The residue was diluted with hexane, and insoluble matter was removed. Then, the filtrate was concentrated under reduced pressure. Tetrahydrofuran (10 mL), (4-aminobutyl)dimethylamine (0.20 g), and triethylamine (0.24 mL) were added to the residue at room temperature. The mixture was stirred for 20 hours, then diluted with ethyl acetate, and sequentially washed with water, an aqueous ammonium chloride solution, and an aqueous sodium bicarbonate solution. The solvent was distilled off under reduced pressure. Acetic acid (3.3 mL) and water (1.7 mL) were added to the residue, and the mixture was stirred at 65° C. for 5 hours. After cooling to room temperature, the solvent was distilled off under reduced pressure. The residue was diluted with ethyl acetate and sequentially washed with an aqueous sodium bicarbonate solution and water. The solvent was distilled off under reduced pressure. N,N-Dimethylformamide (4 mL), DMAP (61 mg), 1-ethyl-3-(3-dimethylaminopropyl)carbodiimide hydrochloride (288 mg), and octanoic acid (0.19 mL) were added to the residue. After stirring at 60° C. for 3 hours, ethyl acetate was added to the reaction mixture, and the mixture was sequentially washed with water and brine. Then, the solvent was distilled off under reduced pressure. The residue was purified by silica gel column chromatography (NH, ethyl acetate/hexane) to obtain the title compound (215 mg).

$^1$H NMR (500 MHz, CDCl$_3$) δ ppm 0.88 (15H, t, J=7.09 Hz) 1.10-1.33 (32H, m) 1.40-1.62 (14H, m) 2.21 (6H, s) 2.25-2.32 (8H, m) 3.16 (2H, m) 4.10 (8H, s) 5.84 (1H, m)

Example 20

3-((3-Butylheptanoyl)oxy)-2-(((3-butylheptanoyl)oxy)methyl)-2-(((4-(dimethylamino)butanoyl)oxy)methyl)propyl (9Z)-hexadec-9-enoate A) (5-(((tert-Butyl(diphenyl)silyl)oxy)methyl)-2,2-dimethyl-1,3-dioxan-5-yl)methyl (9Z)-hexadec-9-enoate To a solution of (5-(((tert-butyl(diphenyl)silyl)oxy)methyl)-2,2-dimethyl-1,3-dioxan-5-yl)methanol (1.50 g), DMAP (0.49 g) and palmitoleic acid (1.01 g) in DMF (15 mL), 1-ethyl-3-(3-dimethylaminopropyl)carbodiimide hydrochloride (0.83 g) was added at 50° C. in a nitrogen atmosphere. After stirring for 21 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (ethyl acetate/hexane) to obtain the title compound (2.11 g).

$^1$H NMR (300 MHz, CDCl$_3$) δ ppm 0.85-0.94 (3H, m), 1.01-1.10 (9H, m), 1.24-1.35 (16H, m), 1.40 (6H, d, J=10.3 Hz), 1.52-1.61 (2H, m), 1.97-2.07 (4H, m), 2.25 (2H, t, J=7.6 Hz), 3.66 (2H, s), 3.77 (4H, q, J=11.8 Hz), 4.18 (2H, s), 5.35 (2H, ddd, J=5.8, 3.4, 2.7 Hz), 7.36-7.47 (6H, m), 7.65-7.69 (4H, m)

B) 3-((tert-Butyl(diphenyl)silyl)oxy)-2,2-bis(((3-butylheptanoyl)oxy)methyl)propyl (9Z)-hexadec-9-enoate To (5-(((tert-butyl(diphenyl)silyl)oxy)methyl)-2,2-dimethyl-1,3-dioxan-5-yl)methyl (9Z)-hexadec-9-enoate (2.11 g), acetic acid (10.6 mL) and water (5.3 mL) were added in a nitrogen atmosphere, and the mixture was stirred at 75° C. for 8 hours. After cooling to room temperature, the solvent was distilled off under reduced pressure. The residue was diluted with ethyl acetate, sequentially washed with a saturated aqueous solution of sodium bicarbonate and water, and dried over anhydrous sodium sulfate. Then, the solvent was distilled off under reduced pressure to obtain a residue (1.95 g). The residue (0.95 g) was weighed in a nitrogen atmosphere and dissolved in a DMF (9.5 mL) solution. To the solution, DMAP (0.42 g) and 3-butylheptanoic acid (0.64 g) were then added, and the mixture was stirred for a while. Then, 1-ethyl-3-(3-dimethylaminopropyl)carbodiimide hydrochloride (0.69 g) was added thereto at 50° C. After stirring for 6 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (ethyl acetate/hexane) to obtain the title compound (0.71 g).

$^1$H NMR (300 MHz, CDCl$_3$) δ ppm 0.84-0.93 (15H, m), 1.05 (9H, s), 1.18-1.37 (40H, m), 1.51-1.60 (2H, m), 1.78 (2H, br d, J=5.2 Hz), 1.97-2.07 (4H, m), 2.17-2.26 (6H, m), 3.63 (2H, s), 4.10-4.17 (6H, m), 5.35 (2H, ddd, J=5.6, 3.5, 2.2 Hz), 7.35-7.48 (6H, m), 7.60-7.65 (4H, m)

C) 3-((3-Butylheptanoyl)oxy)-2-(((3-butylheptanoyl)oxy)methyl)-2-(((4-(dimethylamino)butanoyl)oxy)methyl)propyl (9Z)-hexadec-9-enoate To a solution of 3-((tert-butyl(diphenyl)silyl)oxy)-2,2-bis(((3-butylheptanoyl)oxy)methyl)propyl (9Z)-hexadec-9-enoate (0.71 g) in THF (2.1 mL), a solution of TBAF in THF (1 M, 0.9 mL) was added at room temperature. After stirring overnight at room temperature, the reaction mixture was concentrated under reduced pressure. The residue was diluted with ethyl acetate, washed once with a saturated aqueous solution of sodium bicarbonate and once with saturated brine, and then dried over anhydrous sodium sulfate. The solvent was distilled off under reduced pressure. The residue was dissolved in a DMF (5.3 mL) solution. To the solution, DMAP (0.14 g) and 4-(dimethylamino)butanoic acid hydrochloride (0.19 g) were then added, and the mixture was stirred for a while. Then, 1-ethyl-3-(3-dimethylaminopropyl)carbodiimide hydrochloride (0.24 g) was added thereto at 50° C. After stirring for 8 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (NH, ethyl acetate/hexane) to obtain the title compound (0.31 g).

1H NMR (300 MHz, CDCl$_3$) d ppm 0.85-0.94 (15H, m), 1.20-1.37 (40H, m), 1.55-1.66 (2H, m), 1.66-1.86 (4H, m), 1.97-2.08 (4H, m), 2.21 (6H, s), 2.22-2.39 (10H, m), 4.08-4.17 (8H, m), 5.35 (2H, ddd, J=5.6, 3.5, 2.1 Hz)

Compounds of Examples 2 to 7, 9, 11 to 13, 15 to 17, 19 and 21 set forth below in tables were produced according to any of the methods shown in the examples and methods equivalent thereto. The names of the compounds and their structural formulas, $^1$H NMR chemical shifts and mass numbers (in the tables, indicated by MS) obtained during production are shown in Table 1 as to these examples as well as Examples 1, 8, 10, 14, 18 and 20.

TABLE 1

| Example No. | IUPAC name | Structural formula | NMR data | MS: m/z (M + H) |
|---|---|---|---|---|
| 1 | 3-((5-(Dimethylamino)pentanoyl)oxy)-2,2-bis((octanoyloxy)methyl)propyl 4-heptylundecanoate | Chemical Formula: C$_{46}$H$_{87}$NO$_8$<br>Exact Mass: 781.64<br>Molecular Weight: 782.20 | 1H NMR (500 MHz, CDCl3) d ppm 0.86-0.91 (12H, m), 1.15-1.34 (45H, m), 1.45-1.52 (2H, m), 1.53-1.66 (4H, M), 2.20 (6H, s), 2.23-2.36 (10H, m), 4.11 (8H, s) | 782.18 |

TABLE 1-continued

| Example No. | IUPAC name | Structural formula | NMR data | MS: m/z (M + H) |
|---|---|---|---|---|
| 2 | 2-(((4-(Dimethylamino)butanoyl)oxy)methyl)-2-(((2-hexyloctanoyl)oxy)methyl)propane-1,3-diyl dioctanoate | 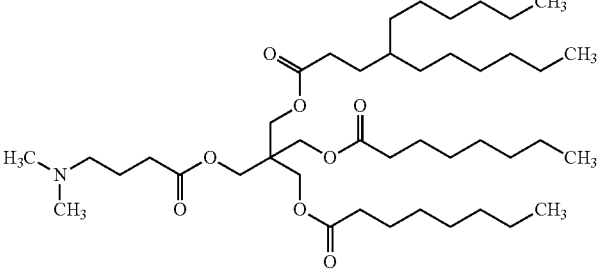<br>Chemical Formula: $C_{41}H_{77}NO_8$<br>Exact Mass: 711.66<br>Molecular Weight: 712.07 | 1H NMR (300 MHz, CDCl3) d ppm 0.80-0.95 (12H, m), 1.15-1.35 (32H, m), 1.37-1.64 (8H, m), 1.70-1.83 (2H, m), 2.20 (6H, s), 2.23-2.41 (9H, m), 4.11 (8H, s) | 712.46 |
| 3 | 2-(((5-(Dimethylamino)pentanoyl)oxy)methyl)-2-(((2-hexyloctanoyl)oxy)methyl)propane-1,3-diyl dioctanoate | 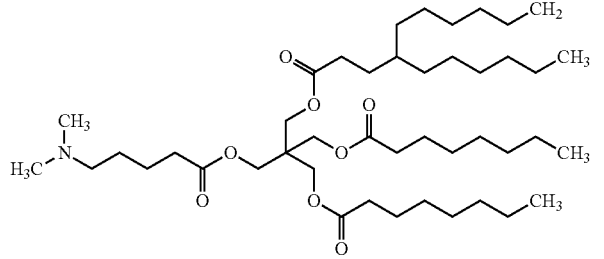<br>Chemical Formula: $C_{42}H_{79}NO_8$<br>Exact Mass: 725.58<br>Molecular Weight: 726.09 | 1H NMR (300 MHz, CDCl3) d ppm 0.81-0.93 (12H, m), 1.14-1.36 (32H, m), 1.39-1.66 (12H, m), 2.20 (6H, s), 2.22-2.38 (9H, m), 4.11 (8H, s) | 726.48 |
| 4 | 2-(((4-(Dimethylamino)butanoyl)oxy)methyl)-2-((heptanoyloxy)methyl)propane-1,3-diyl bis(2-pentylheptanoate) | 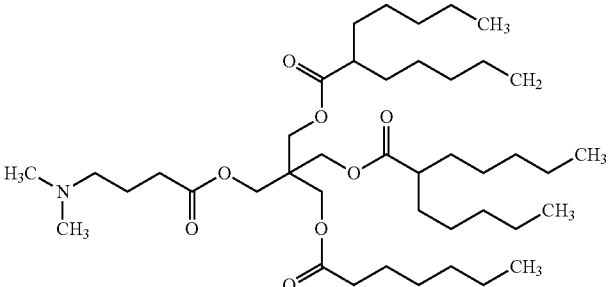<br>Chemical Formula: $C_{42}H_{79}NO_8$<br>Exact Mass: 725.58<br>Molecular Weight: 726.09 | 1H NMR (300 MHz, CDCl3) d ppm 0.78-0.95 (15H, m), 1.14-1.35 (30H, m), 1.37-1.57 (10H, m), 1.68-1.83 (2H, m), 2.20 (6H, s), 2.23-2.42 (8H, m), 4.10 (8H, s) | 726.53 |
| 5 | 2-(((5-(Dimethylamino)pentanoyl)oxy)methyl)-2-((heptanoyloxy)methyl)propane-1,3-diyl bis(2-pentylheptanoate) | 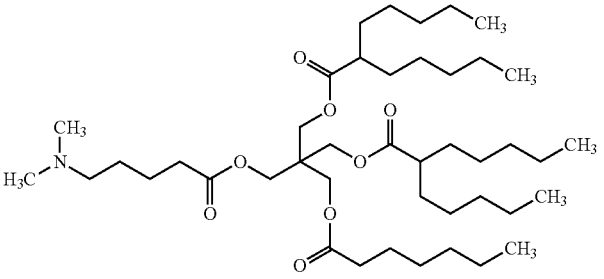<br>Chemical Formula: $C_{43}H_{81}NO_8$<br>Exact Mass: 739.60<br>Molecular Weight: 740.12 | 1H NMR (300 MHz, CDCl3) d ppm 0.81-0.94 (15H, m), 1.14-1.35 (30H, m), 1.37-1.66 (14H, m), 2.20 (6H, s), 2.22-2.39 (8H, m), 4.10 (8H, s) | 740.56 |

TABLE 1-continued

| Example No. | IUPAC name | Structural formula | NMR data | MS: m/z (M + H) |
|---|---|---|---|---|
| 6 | 2-(((4-(Dimethylamino)butanoyl)oxy)methyl)-2-((octanoyloxy)methyl)propane-1,3-diyl bis(2-hexyloctanoate) | 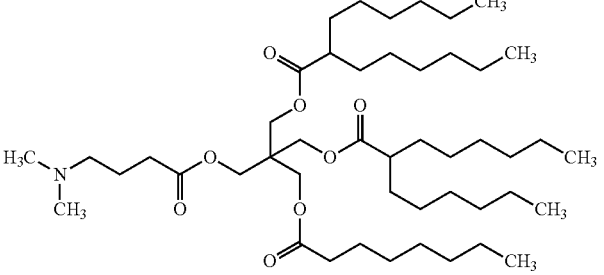<br>Chemical Formula: C₄₇H₈₉NO₈<br>Exact Mass: 795.66<br>Molecular Weight: 796.23 | 1H NMR (300 MHz, CDCl3) d ppm 0.81-0.93 (15H, m), 1.13-1.36 (40H, m), 1.39-1.61 (10H, m), 1.70-1.83 (2H, m), 2.20 (6H, s), 2.23-2.41 (8H, m), 4.10 (8H, s) | 796.58 |
| 7 | 2-(((5-(Dimethylamino)pentanoyl)oxy)methyl)-2-((octanoyloxy)methyl)propane-1,3-diyl bis(2-hexyloctanoate) | 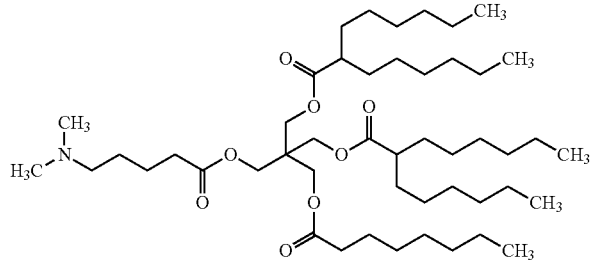<br>Chemical Formula: C₄₈H₉₁NO₈<br>Exact Mass: 809.67<br>Molecular Weight: 810.25 | 1H NMR (300 MHz, CDCl3) d ppm 0.81-0.93 (15H, m), 1.13-1.35 (40H, m), 1.36-1.67 (14H, m), 2.20 (6H, s), 2.22-2.39 (8H, m), 4.10 (8H, s) | 810.58 |
| 8 | 2-(((6-(Dimethylamino)hexanoyl)oxy)methyl-2-((octanoyloxy)methyl)propane-1,3-diyl bis(2-hexyloctanoate) | 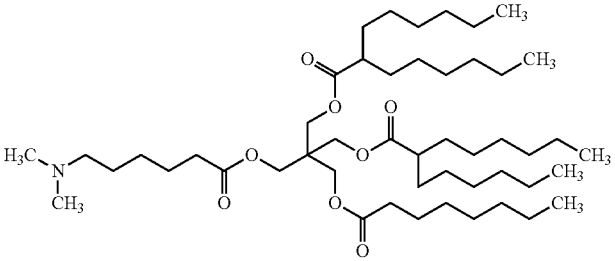<br>Chemical Formula: C₄₉H₉₃NO₈<br>Exact Mass: 823.69<br>Molecular Weight: 824.28 | 1H NMR (500 MHz, CDCl3) d ppm 0.83-0.92 (15H, m), 1.19-1.34 (42H, m), 1.39-1.50 (6H, m), 1.52-1.73 (8H, m) 2.21 (6H, s), 2.21-2.35 (8H, m), 4.10 (8H, s) | 824.67 |
| 9 | 2-(((5-(Dimethylamino)pentanoyl)oxy)methyl-2-((octanoyloxy)methyl)propane-1,3-diyl bis(3-pentyloctanoate) | 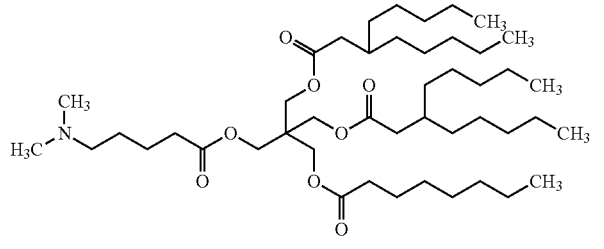<br>Chemical Formula: C₄₆H₈₇NO₈<br>Exact Mass: 781.64<br>Molecular Weight: 782.20 | 1H NMR (500 MHz, CDCl3) d ppm 0.88 (15H, t, J = 7.09Hz), 1.22-1.32 (40H, m), 1.45-1.53 (2H, m), 1.55-1.58 (4H, m), 1.77-1.86 (2H, m), 2.22 (6H, s), 2.21-2.30 (10H, m), 4.10 (8H, s) | 782.65 |

TABLE 1-continued

| Example No. | IUPAC name | Structural formula | NMR data | MS: m/z (M + H) |
|---|---|---|---|---|
| 10 | 3-((5-(Dimethylamino)pentanoyl)oxy)-2,2-bis((octanoyloxy)methyl)propyl 4,5-dibutylnonanoate | 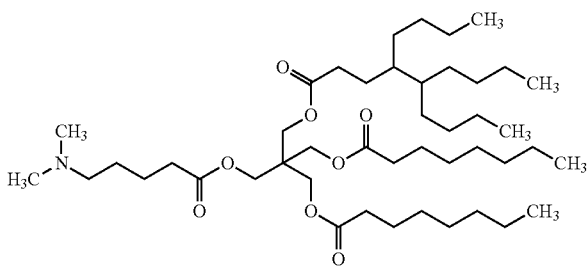<br>Chemical Formula: $C_{45}H_{85}NO_8$<br>Exact Mass: 767.63<br>Molecular Weight: 768.17 | 1H NMR (500 MHz, CDCl3) d ppm 0.84-0.91 (15H, m), 1.09-1.31 (36H, m), 1.42-1.52 (3H, m), 1.54-1.56 (7H, m), 2.21 (6H, s), 2.24-2.35 (10H, m), 4.07-4.13 (8H, m) | 768.63 |
| 11 | 3-((6-(Dimethylamino)hexanoyl)oxy)-2,2-bis((octanoyloxy)methyl)propyl 4,5-dibutylnonanoate | 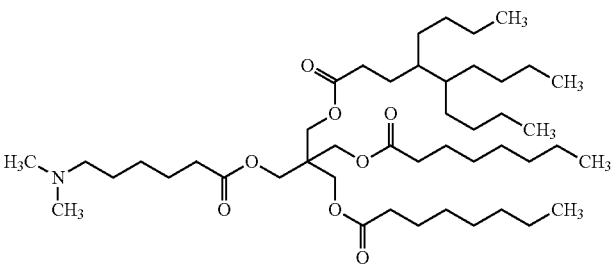<br>Chemical Formula: $C_{46}H_{87}NO_8$<br>Exact Mass: 781.64<br>Molecular Weight: 782.20 | 1H NMR (500 MHz, CDCl3) d ppm 0.85-0.92 (15H, m), 1.11-1.16 (2H, m), 1.18-1.34 (36H, m), 1.41-1.51 (3H, m), 1.54-1.66 (6H, m), 1.77 (1H, br s), 2.21 (6H, s), 2.22-2.33 (10H, m), 4.11 (8H, s) | 782.65 |
| 12 | 3-((5-(Dimethylamino)pentanoyl)oxy)-2,2-bis((hexanoyloxy)methyl)propyl 4,5-dipentyldecanoate | 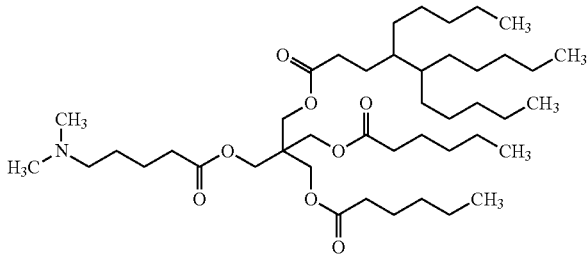<br>Chemical Formula: $C_{44}H_{83}NO_8$<br>Exact Mass: 753.61<br>Molecular Weight: 754.15 | 1H NMR (500 MHz, CDCl3) d ppm 0.89 (15H, td, J = 7.1, 4.4Hz), 1.06-1.18 (3H, m), 1.19-1.35 (30H, m), 1.49 (3H, dt, J = 15.3, 7.5Hz), 1.54-1.68 (8H, m), 2.22 (6H, s), 2.24-2.36 (10H, m), 4.11 (8H, s) | 754.82 |

TABLE 1-continued

| Example No. | IUPAC name | Structural formula | NMR data | MS: m/z (M + H) |
|---|---|---|---|---|
| 13 | 3-((5-(Dimethylamino)pentanoyl)oxy)-2,2-bis((octanoyloxy)methyl)propyl 4,5-dipentyldecanoate | 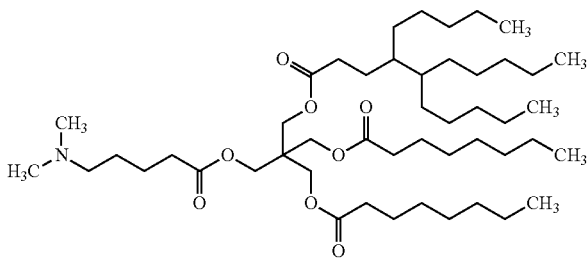<br>Chemical Formula: $C_{48}H_{91}NO_8$<br>Exact Mass: 809.67<br>Molecular Weight: 810.25 | 1H NMR (500 MHz, CDCl3) d ppm 0.86-0.91 (15H, m), 0.98-1.18 (2H, m), 1.19-1.33 (40H, m), 1.48 (3H, dt, J = 15.1, 7.4Hz), 1.54-1.72 (7H, m), 2.21 (6H, s), 2.23-2.35 (100H, m), 4.11 (8H, s) | 810.68 |
| 14 | 2-(((4,5-Dibutylnonanoyl)oxy)methyl)-2-(((5-(dimethylamino)pentanoyl)oxy)methyl)propane-1,3-diyl didecanoate | 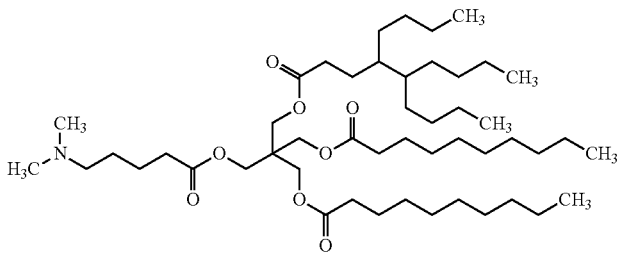<br>Chemical Formula: $C_{49}H_{93}NO_8$<br>Exact Mass: 823.69<br>Molecular Weight: 824.28 | 1H NMR (500 MHz, CDCl3) d ppm 0.84-0.93 (15H, m), 1.10-1.32 (44H, m), 1.40-1.54 (3H, m), 1.54-1.66 (7H, m), 2.21 (6H, s), 2.23-2.35 (10H, m), 4.11 (8H, s) | 824.70 |
| 15 | 3-((5-(Dimethylamino)pentanoyl)oxy)-2,2-bis((hexanoyloxy)methyl)propyl 4,5-dibutylnonanoate | 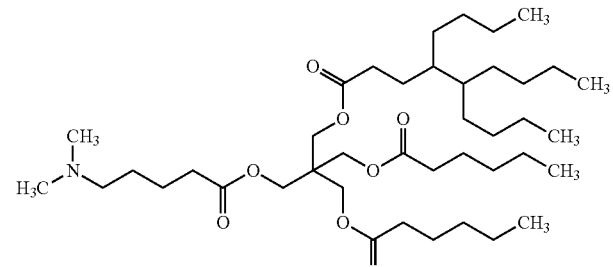<br>Chemical Formula: $C_{41}H_{77}NO_8$<br>Exact Mass: 711.56<br>Molecular Weight: 712.07 | 1H NMR (500 MHz, CDCl3) d ppm 0.85-0.93 (15H, m), 1.11-1.35 (29H, m), 1.41-1.52 (3H, m), 1.55-1.66 (6H, m), 2.21 (6H, s), 2.23-2.38 (10H, m), 4.12 (8H, s) | 712.57 |

TABLE 1-continued

| Example No. | IUPAC name | Structural formula | NMR data | MS: m/z (M + H) |
|---|---|---|---|---|
| 16 | 2-(((5-(Dimethylamino)pentanoyl)oxy)methyl)-2-(((4,5-dipropyloctanoyl)oxy)methyl)propane-1,3-diyl didecanoate | Chemical Formula: $C_{46}H_{87}NO_8$<br>Exact Mass: 781.64<br>Molecular Weight: 782.20 | 1H NMR (500 MHz, CDCl3) d ppm 0.85-0.91 (15H, m), 1.11 (3H, dtd, J = 12.6, 6.1, 6.1, 2.8 Hz), 1.18-1.32 (34H, m), 1.42-1.54 (3H, m), 1.55-1.65 (8H, m), 2.21 (6H, s), 2.22-2.35 (10H, m), 4.11 (8H, s) | 782.65 |
| 17 | 3-((5-(Dimethylamino)pentanoyl)oxy)-2,2-bis((octanoyloxy)methyl)propyl 4,5-dipropyloctanoate | Chemical Formula: $C_{42}H_{79}NO_8$<br>Exact Mass: 725.58<br>Molecular Weight: 726.09 | 1H NMR (500 MHz, CDCl3) d ppm 0.85-0.91 (15H, m), 1.07-1.15 (3H, m), 1.18-1.33 (26H, m), 1.42-1.51 (3H, m), 1.55-1.66 (8H, m), 2.20 (6H, s), 2.22-2.35 (10H, m), 4.11 (8H, s) | 726.59 |
| 18 | 3-(((4-(Dimethylamino)butyl)carbamoyl)oxy)-2,2-bis((octanoyloxy)methyl)propyl 4,5-dibutylnonanoate | Chemical Formula: $C_{45}H_{86}N_2O_8$<br>Exact Mass: 782.64<br>Molecular Weight: 783.19 | 1H NMR (500 MHz, CDCl3) d ppm 0.88 (15H, t, J = 7.09Hz), 1.10-1.33 (32H, m), 1.40-1.62 (14H, m) 2.21 (6H, s) 2.25-2.32 (8H, m) 3.16 (2H, m) 4.10 (8H, s) 5.84 (1H, m) | 783.65 |

TABLE 1-continued

| Example No. | IUPAC name | Structural formula | NMR data | MS: m/z (M + H) |
|---|---|---|---|---|
| 19 | 3-((4-(Dimethylamino)butanoyl)oxy)-2,2-bis((octanoyloxy)methyl)propyl 4,5-dibutylnonanoate | Chemical Formula: $C_{44}H_{83}NO_8$<br>Molecular Weight: 754.15 | 1H NMR (300 MHz, CDCl3) d ppm 0.89 (15H, dq, J = 6.7, 3.4Hz), 1.05-1.17 (3H, m), 1.21-1.34 (31H, m), 1.45-1.63 (10H, m), 2.22 (6H, s), 2.24-2.39 (10H, m), 4.09-4.16 (8H, m) | 754.62 |
| 20 | 3-((3-Butylheptanoyl)oxy)-2-(((3-butylheptanoyl)oxy)methyl)-2-(((4-(dimethylamino)butanoyl)oxy)methyl)propyl (9Z)-hexadec-9-enoate | Chemical Formula: $C_{49}H_{91}NO_8$<br>Molecular Weight: 822.27<br>C15:1 | 1H NMR (300 MHz, CDCl3) d ppm 0.85-0.94 (15H, m), 1.20-1.37 (40H, m), 1.55-1.66 (2H, m), 1.66-1.86 (4H, m), 1.97-2.08 (4H, m), 2.21 (6H, s), 2.22-2.39 (10H, m), 4.08-4.17 (8H, m), 5.35 (2H, ddd. J = 5.6, 3.5, 2.1Hz) | 822.68 |
| 21 | 3-((3-Butylheptanoyl)oxy)-2-(((3-butylheptanoyl)oxy)methyl)-2-(((4-(dimethylamino)butanoyl)oxy)methyl)propyl (9Z, 12Z)-octadeca-9,12-dienoate | Chemical Formula: $C_{51}H_{93}NO_8$<br>Exact Mass: 847.69<br>Molecular Weight: 848.30 | 1H NMR (300 MHz, CDCl3) d ppm 0.84-0.93 (15H, m), 1.19-1.40 (38H, m), 1.54-1.87 (6H, m), 2.00-2.09 (4H, m), 2.19-2.38 (16H, m), 2.77 (2H, t, J = 5.9Hz), 4.10 (8H, s), 5.28-5.43 (4H, m) | 848.70 |

Production Example 1

Production Example of siRNA-Encapsulated Lipid Nanoparticle

A lipid mixture (cationic lipid:DPPC:cholesterol:GS-020=60:10.6:28:1.4, molar ratio) was dissolved in 90% of EtOH and 10% of a 25 mM acetate buffer solution (pH 4.0) to obtain a 7.4 mg/ml lipid solution. Luciferase (luc) siRNA (see Table 2) was dissolved in a 25 mM acetate buffer solution (pH 4.0) to obtain a 0.15 mg/ml nucleic acid solution. The obtained lipid solution and nucleic acid solution were mixed at a flow rate ratio of 1 ml/min:5 ml/min at room temperature using Asia microfluidic system (Syrris Ltd.) to obtain a dispersion containing a composition. The obtained dispersion was dialyzed against water at room temperature for 1 hour and against PBS at room temperature for 18 hours using Slyde-A-Lyzer (molecular weight cutoff: 20 K, Thermo Fischer Scientific Inc.). Subsequently, the dialysate was filtered through a 0.2 μm syringe filter (Iwaki and preserved at 4° C. Analysis results are shown in Table 3. Hereinafter, the particle size of the lipid particle in the composition was calculated as a Z-average particle size by the cumulant analysis of an autocorrelation function using a particle size measurement apparatus Zetasizer Nano ZS (Malvern Instruments) based on a dynamic light scattering measurement technique.

TABLE 2

Sequence of Luc siRNA

| | |
|---|---|
| Sense | 5' - [mC][mU][mU]A[mC]G[mC][mU]GAG[mU]A[mC][mU][mU][mC]GA[ts]t - 3' |
| Antisense | 5' - UCGAAGUACUCAGCGUAAG[ts]t -3' |

N: RNA
n: DNA
[mN]: 2'-OMe RNA
[ns]: phosphorothioate bond

TABLE 3

| Cationic lipid | Average particle size (nm) | siRNA concentration (μg/ml) | Rate of encapsulation (%) |
|---|---|---|---|
| Example 2 | 71 | 415 | 96 |
| Example 3 | 81 | 445 | 96 |
| Example 4 | 73 | 121 | 91 |
| Example 5 | 83 | 120 | 96 |
| Example 6 | 77 | 389 | 93 |
| Example 7 | 73 | 376 | 97 |

Production Example 2

Production Example of mRNA-Encapsulated Lipid Nanoparticle

A lipid mixture (cationic lipid:DPPC:cholesterol:GS-020=60:10.6:28:1.4, molar ratio) was dissolved in 90% of EtOH and 10% of water to obtain an 8.5 mg/ml lipid solution. Luciferase mRNA (TriLink BioTechnologies, Inc.) was dissolved in a 10 mM 2-morpholinoethanesulfonic acid (MES) buffer solution (pH 4.0) to obtain a 0.22 mg/ml nucleic acid solution. The obtained lipid solution and nucleic acid solution were mixed at a flow rate ratio of 3 ml/min:6 ml/min at room temperature using NanoAssemblr apparatus (Precision NanoSystems Inc.) to obtain a dispersion containing a composition. The obtained dispersion was dialyzed against water at room temperature for 1 hour and against PBS at 4° C. for 48 hours using Slyde-A-Lyzer (molecular weight cutoff: 20 K, Thermo Fischer Scientific Inc.). Subsequently, the dialysate was filtered through a 0.2 μm syringe filter (Iwaki) and preserved at 4° C. Analysis results are shown in Table 4.

TABLE 4

| Cationic lipid | Average particle size (nm) | mRNA concentration (μg/ml) | Rate of encapsulation (%) |
|---|---|---|---|
| Example 1 | 112 | 145 | 96 |
| Example 8 | 103 | 97 | 91 |
| Example 9 | 96 | 77 | 94 |
| Example 10 | 123 | 83 | 96 |
| Example 11 | 122 | 78 | 93 |
| Example 12 | 134 | 160 | 93 |
| Example 13 | 119 | 155 | 99 |

TABLE 4-continued

| Cationic lipid | Average particle size (nm) | mRNA concentration (μg/ml) | Rate of encapsulation (%) |
|---|---|---|---|
| Example 14 | 88 | 134 | 94 |
| Example 15 | 164 | 127 | 99 |
| Example 16 | 109 | 134 | 94 |
| Example 17 | 152 | 116 | 87 |
| Example 18 | 77 | 103 | 99 |

Test Example 1

Test Example of Transfection of Cultured Cell with siRNA

A human liver cancer-derived cell line Hep3B stably expressing luciferase was cultured at a cell density of 6000 cells/well in a 96-well plate. 24 hours later, 10 μl of the lipid particle containing luciferase siRNA was added to the medium. 48 hours after the addition of siRNA, the amount of decrease in expression (knockdown) of luciferase was measured using Picagene LT2.0 kit (Toyobo Co., Ltd.). A siRNA concentration necessary for 50% knockdown calculated from the measurement results are shown in Table 5.

TABLE 5

| Cationic lipid | siRNA concentration necessary for 50% knockdown (nM) |
|---|---|
| Example 2 | 14 |
| Example 3 | 55 |
| Example 4 | 190 |
| Example 5 | 28 |
| Example 6 | 41 |
| Example 7 | 1.2 |

Test Example 2

Test Example of Transfection of Cultured Cell with mRNA

A human colorectal cancer-derived cell line HCT116 was cultured at a cell density of 6000 cells/well in a 96-well plate. 24 hours later, 10 μl of the lipid particle containing 10 ng of luciferase mRNA was added to the medium. 24 hours after the addition of mRNA, a reagent of Picagene LT2.0 kit (Toyobo Co., Ltd.) was added to the culture plate of HCT116. The luminescence (count per sec (cps)) of luciferase was measured using a luminescence plate reader EnVision (PerkinElmer, Inc.). The measurement results are shown in Tables 6 to 10.

TABLE 6

| Cationic lipid | Average luminescence (cps) of 3 wells |
|---|---|
| PBS control | 1040 |
| Example 8 | 381693 |

TABLE 7

| Cationic lipid | Average luminescence (cps) of 3 wells |
| --- | --- |
| PBS control | 413 |
| Example 9 | 63493 |

TABLE 8

| Cationic lipid | Average luminescence (cps) of 3 wells |
| --- | --- |
| PBS control | 1293 |
| Example 10 | 500747 |
| Example 11 | 572560 |

TABLE 9

| Cationic lipid | Average luminescence (cps) of 3 wells |
| --- | --- |
| PBS control | 80 |
| Example 10 | 176813 |
| Example 12 | 62587 |
| Example 13 | 269467 |

TABLE 10

| Cationic lipid | Average luminescence (cps) of 3 wells |
| --- | --- |
| PBS control | 293 |
| Example 1 | 110733 |
| Example 10 | 112893 |
| Example 14 | 178133 |
| Example 15 | 3293 |
| Example 16 | 141560 |
| Example 17 | 7987 |
| Example 18 | 12813 |

Production Example 3

Production Example of siRNA-Encapsulated Lipid Nanoparticle

A lipid mixture (cationic lipid:DPPC:cholesterol:GS-020=60:10.6:28:1.4, molar ratio) was dissolved in 90% of EtOH and 10% of a 25 mM acetate buffer solution (pH 4.0) to obtain a 7.4 mg/ml lipid solution. siRNA against collagen 1a1 (Col1a1) and siRNA against factor VII (FVII) were dissolved in equal weights in a 25 mM acetate buffer solution (pH 4.0) to obtain a 0.15 mg/ml nucleic acid solution. The sequences of Col1a1 siRNA and FVII siRNA were quoted from Hepatology, Vol. 672, No. 4, 2015, and Silence, Vol. 1, No. 16, 2010, respectively. Each siRNA sequence is shown in Table 11. The obtained lipid solution and nucleic acid solution were mixed at a flow rate ratio of 1 ml/min:5 ml/min using a microfluidic mixing apparatus NanoAssemblr (Precision NanoSystems Inc.) to obtain a dispersion containing a composition. The obtained dispersion was dialyzed against water at room temperature for 1 hour and against PBS at room temperature for 18 hours using Slyde-A-Lyzer (molecular weight cutoff: 20 K, Thermo Fischer Scientific Inc.). Subsequently, the dialysate was filtered through a 0.2 μm syringe filter (Iwaki) and preserved at 4° C. Results of analyzing the siRNA-encapsulated lipid nanoparticle are shown in Table 12. The siRNA-encapsulated lipid nanoparticle was very favorably formed using the compound of the present invention.

TABLE 11

| Sequence of Col1a1 siRNA | |
| --- | --- |
| Sense | 5' - G[mU][mC][mU]AGA[mC]A[mU]G[mU][mU][mC]AG[mC][mU][mU][ts]t - 3' |
| Antisense | 5' - AAGCUGAA[mC]AUGUC[mU]AGAC[ts]t - 3' |
| Sequence of FVII siRNA | |
| Sense | 5' - GGA[fU][fC]A[fU][fC][fU][fC]AAG[fU][fC][fU][fU]A[fC][ts]t - 3' |
| Antisense | 5' - G[fU]AAGA[fC][fU][fU]GAGA[fU]GA[fU][fC][fC][ts]t - 3' |

N: RNA  
n: DNA  
[mN]: 2'-OMe RNA  
[ns]: phosphorothioate bond  
[fN]: 2'-F RNA

TABLE 12

Results of analyzing siRNA-encapsulated lipid nanoparticle

| Cationic lipid | Particle size (nm) | Col1a1 siRNA + FVII siRNA concentration (μg/ml) | Rate of encapsulation (%) |
| --- | --- | --- | --- |
| Example 1 | 111 | 128 | 98 |
| Example 10 | 101 | 137 | 97 |
| Example 11 | 91 | 320 | 97 |
| Example 13 | 103 | 122 | 97 |
| Example 14 | 97 | 126 | 96 |
| Example 16 | 103 | 124 | 96 |
| Example 19 | 89 | 112 | 96 |

Test Example 3

Test Example of Hepatic Collagen 1a1 Gene Knockdown in CCl4 Hepatic Fibrosis Mouse Model The Col1a1 siRNA-encapsulated lipid nanoparticle was administered at 0.1 mg/kg into the orbital plexus of the vein of each 8-week-old male Balb/c mouse. 3 hours later, CCl4 mixed with corn oil was orally administered at a dose of 0.1 mL/kg (10 mL/kg) by forced single-dose administration (n=6 in each group). 4 days after the administration of the siRNA-encapsulated lipid nanoparticle, the liver was collected from the mouse euthanized under anesthesia, followed by gene expression analysis by quantitative PCR. The Col1a1 gene expression level and the FVII gene expression level were normalized with the expression level of GAPDH. The amount of decrease in Col1a1 gene expression as compared with a siRNA non-administration group was regarded as the rate of knockdown. The obtained results are shown in Table 13. In mice intravenously given the siRNA-encapsulated lipid nanoparticle formed using the compound of the present invention, the knockdown of the activated stellate cell marker gene Col1a1 gene was strongly observed, as compared with the rate of knockdown of the hepatic parenchymal cell marker gene FVII.

TABLE 13

Results of knockdown test of hepatic Col1a1 gene and FVII gene in CCl4 hepatic fibrosis mouse model

| Cationic lipid | Col1a1 siRNA + FVII siRNA (mg/kg) | Rate of Col1a1 knockdown (%) | Rate of FVII knockdown (%) |
|---|---|---|---|
| Example 1 | 0.1 + 0.1 | 86 | 0 |
| Example 10 | 0.1 + 0.1 | 77 | 0 |
| Example 11 | 0.1 + 0.1 | 77 | 21 |
| Example 13 | 0.1 + 0.1 | 86 | 15 |
| Example 14 | 0.1 + 0.1 | 76 | 16 |
| Example 16 | 0.1 + 0.1 | 74 | 15 |
| Example 19 | 0.1 + 0.1 | 71 | 31 |

INDUSTRIAL APPLICABILITY

The compound, the lipid particle or the composition of the present invention is capable of efficiently transferring a nucleic acid to various cells, tissues or organs. Thus, the compound, the lipid particle or the composition of the present invention can be utilized as a DDS technique for nucleic acid medicaments. Furthermore, the compound, the lipid particle or the composition of the present invention can also be utilized as a nucleic acid transfer reagent for research.

Free Text of Sequence Listing

SEQ ID NOs: 1 and 2: siRNA (sense strand and antisense strand, see Table 2) for suppressing expression of the luciferase gene, used in Production Example 2. SEQ ID NOs: 3 and 4: siRNA (sense strand and antisense strand, see Table 11) for suppressing expression of the collagen 1A1 gene, used in Production Example 3. SEQ ID NOs: 5 and 6: siRNA (sense strand and antisense strand, see Table 11) for suppressing expression of the factor VII gene, used in Production Example 3.

The invention claimed is:

1. A compound represented by the formula (I):

(a) [Formula 1]

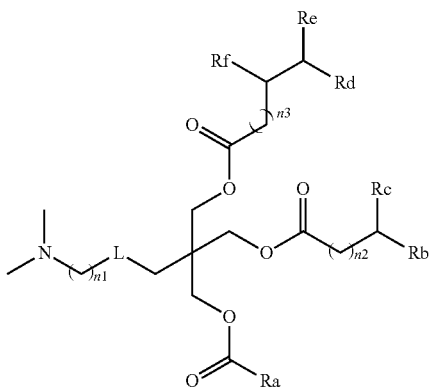

(I)

wherein n1 represents an integer of 2 to 6, n2 represents an integer of 0 to 2, n3 represents an integer of 0 to 2, L represents —C(O)O— or —NHC(O)O—, Ra represents a linear $C_{5-13}$ alkyl group, a linear $C_{13-17}$ alkenyl group or a linear $C_{17}$ alkadienyl group, Rb represents a linear $C_{2-9}$ alkyl group, Rc represents a hydrogen atom or a linear $C_{2-9}$ alkyl group, Rd represents a hydrogen atom or a linear $C_{2-9}$ alkyl group, Re represents a linear $C_{2-9}$ alkyl group, and Rf represents a linear $C_{2-9}$ alkyl group, or a salt thereof.

2. The compound according to claim 1, wherein the compound is 3-((5-(Dimethylamino)pentanoyl)oxy)-2,2-bis ((octanoyloxy)methyl)propyl 4,5-dibutylnonanoate or a salt thereof.

3. The compound according to claim 1, wherein the compound is 2-(((4,5-Dibutylnonanoyl)oxy)methyl)-2-(((5-(dimethylamino)pentanoyl)oxy)methyl)propane-1,3-diyl-didecanoate or a salt thereof.

4. The compound according to claim 1, wherein the compound is 3-((6-(Dimethylamino)hexanoyl)oxy)-2,2-bis ((octanoyloxy)methyl)propyl 4,5-dibutylnonanoate or a salt thereof.

5. The compound according to claim 1, wherein the compound is 3-((5-(Dimethylamino)pentanoyl)oxy)-2,2-bis ((octanoyloxy)methyl)propyl 4,5-dipentyldecanoate or a salt thereof.

6. The compound according to claim 1, wherein the compound is 3-((5-(Dimethylamino)pentanoyl)oxy)-2,2-bis ((octanoyloxy)methyl)propyl 4-heptylundecanoate or a salt thereof.

7. A lipid particle comprising a compound according to claim 1 or a salt thereof.

8. A composition for nucleic acid transfer comprising a nucleic acid and a lipid particle according to claim 7.

9. The composition according to claim 8, wherein the nucleic acid is RNA.

10. The composition according to claim 9, wherein the RNA is mRNA or siRNA.

* * * * *